United States Patent
Rambaud (10) Patent No.: US 12,381,734 B2
(45) Date of Patent: Aug. 5, 2025

(54) SYSTEMS AND METHODS FOR IMPLEMENTING LINEAR VIEW-CHANGE IN A BYZANTINE FAULT TOLERANT (BFT) PROTOCOL

(71) Applicant: INSTITUT MINES TELECOM, Palaiseau (FR)

(72) Inventor: Matthieu Rambaud, Palaiseau (FR)

(73) Assignee: Institut Mines Telecom, Palaiseau (FR)

( * ) Notice: Subject to any disclaimer, the term of this patent is extended or adjusted under 35 U.S.C. 154(b) by 274 days.

(21) Appl. No.: 17/993,401

(22) Filed: Nov. 23, 2022

(65) Prior Publication Data
US 2023/0163973 A1 May 25, 2023

Related U.S. Application Data

(60) Provisional application No. 63/282,754, filed on Nov. 24, 2021.

(51) Int. Cl.
G06F 11/18 (2006.01)
H04L 9/00 (2022.01)
H04L 9/32 (2006.01)

(52) U.S. Cl.
CPC ......... H04L 9/3239 (2013.01); G06F 11/183 (2013.01); G06F 11/187 (2013.01); H04L 9/50 (2022.05); H04L 2209/463 (2013.01)

(58) Field of Classification Search
CPC ... H04L 9/3239; H04L 9/50; H04L 2209/463; H04L 9/3263; H04L 9/3255
See application file for complete search history.

(56) References Cited

U.S. PATENT DOCUMENTS

6,671,821 B1 * 12/2003 Castro ................. G06F 11/1482
714/21
2019/0377645 A1 * 12/2019 Abraham .............. G06F 11/183
(Continued)

FOREIGN PATENT DOCUMENTS

CN 112866399 A * 5/2021 ......... H04L 63/0442

OTHER PUBLICATIONS

Miguel Castro and Barbara Liskov, "Practical Byzantine Fault Tolerance", the Proceedings of the Third Symposium on Operating Systems Design and Implementation, New Orleans, USA, Feb. 1999 (Year: 1999).*

(Continued)

*Primary Examiner* — Zhimei Zhu
(74) *Attorney, Agent, or Firm* — Shumaker, Loop & Kendrick, LLP (57) ABSTRACT

A method for implementing linear view-change in a BFT protocol running on a distributed system including n replicas, wherein no more than t of the n replicas are faulty, and wherein the BFT protocol enables the non-faulty replicas to agree on how to sequence execution of a plurality of service operations originating from one or more clients. The method including executing, among and by the n replicas, a phase $\varphi$ of the BFT protocol, communicating instances of a lock certificate being associated with said phase; and if $2t+1$ communicating instances of said lock certificate are not received by the n replicas within a predetermined timeout period, initiating a view-change with at least the following step: if said current phase $\varphi$ is different than 1, each replica $P_{i(i=1 \ldots n)}$ sets $\varphi_i$ the highest phase up to said current phase.

24 Claims, 2 Drawing Sheets

(56) References Cited

U.S. PATENT DOCUMENTS

| | | | | |
|---|---|---|---|---|
| 2019/0377648 A1* | 12/2019 | Abraham | ............ | G06F 11/2023 |
| 2021/0334177 A1* | 10/2021 | Abraham | ............ | G06F 11/2041 |
| 2022/0391410 A1* | 12/2022 | Abraham | .......... | G06F 16/24535 |
| 2023/0163973 A1* | 5/2023 | Rambaud | .............. | H04L 9/3239 |
| | | | | 713/176 |

OTHER PUBLICATIONS

Niu, Jianyu et al. "Leaderless Byzantine Fault Tolerant Consensus", obtained online from <https://www.researchgate.net/publication/346614405_Leaderless_Byzantine_Fault_Tolerant_Consensus>, retrieved on Nov. 7, 2024. (Year: 2020).*

Z. Xiang, D. Malkhi, K. Nayak and L. Ren, "Strengthened Fault Tolerance in Byzantine Fault Tolerant Replication," in 2021 IEEE 41st International Conference on Distributed Computing Systems (ICDCS), DC, USA, 2021, pp. 205-215 (Year: 2021).*

Mark Abspoel, Thomas Attema, and Matthieu Rambaud. 2021. Brief Announcement Malicious Secuirty comes for Free in Consensus with Leaders. In Proceedings of the 2021 ACM Symposium on Principles of Distributed Computing (PODC'21). Association for Computing Machinery, New York, NY, USA, 195-198. (Year: 2021).*

\* cited by examiner

SYSTEMS AND METHODS FOR IMPLEMENTING LINEAR VIEW-CHANGE IN A BYZANTINE FAULT TOLERANT (BFT) PROTOCOL

FIELD OF THE DISCLOSURE

The disclosure relates to Byzantine Fault Tolerant (BFT) protocols running on distributed systems, and in particular to linear view-changes with optimistic responsiveness in such protocols running on distributed systems comprising n replicas. Various embodiments of this disclosure relate generally to systems and methods for implementing linear view-change with optimistic responsiveness in a Byzantine Fault Tolerant (BFT) protocol running on a distributed system.

BACKGROUND

The problem of consensus is the oldest and most studied task in distributed systems, as described in C. Badertscher et al, CRYPTO 2017; M. Ben-Or, SIGACT-SIGOPS 1983; C. Dwork et al, J. ACM 1988; M. J. Fischer et al. J. ACM 1985; P. Gazi et al, 2020 ACM SIGSAC: L. Lamport et al, ACM Trans. Program. Lang. Syst. 1982.

Deterministic algorithms for consensus are considered, where n players want to agree on some value in the presence of a malicious adversary that corrupts up to t of them. The present invention is applicable to any n greater than or equal to 3t+1 and is advantageously exemplified on the specific case n=3t+1. Each player inputs a value, and the goal is for the honest, i.e. non-corrupted or non-faulty, players to output the same value, in order to have consistency, while also ensuring that the output value satisfies some publicly checkable validity predicate. This constraint, known as "external validity", as described in C. Cachin et al, CRYPTO 2001, naturally arises in the related problem of fault-tolerant state machine replication, which can be seen as an ordered sequence of consensus instances (M. Castro et al, OSDI '99; L. Lamport, ACM Trans. Comput. Syst 1998; M. Yin et al, PODC 2019). Typical predicates are a proof of work, or the signature of a request by some authorized client.

In the known methods, players are connected through an asynchronous network controlled by the adversary, which may inspect all messages, and arbitrarily alter, reroute, drop, delay, or replay them. A bulletin board is assumed where players can publish public keys (PKI). This enables digital signatures, and thus in turn guarantees the integrity and authenticity of messages. In such a model, asynchronous consensus is not solvable (M. J. Fischer, J. ACM 32, 2, 1985).

Various ways around this are known (I. Abraham et al, PODC 2019; E. Blum et al, IACR Cryptol. ePrint Arch. 2020; R. Canetti, Symposium on Theory of Computing 1993), where a negligible probability of failure is assumed, but these protocols require a shared key or a common coin, whose implementation requires a cubic communication complexity (I. Abraham et al, Podc '21; E. Kokoris-Kogias et al, ACM CCS 2020).

To avoid this, other methods consider the classical conditional termination condition known as partial synchrony (C. Dwork et al, J. ACM 1988), which is used in most of the deterministic state machine replication algorithms (P. Aublin et al, ACM Trans. Comput. Syst. 32, 4 2015; M. Castro et al. OSDI '99; Guy Golan-Gueta et al, CoRR 2018; M. Yin et al, PODC 2019). These protocols proceed by consecutive timeframes which may be denoted as "phases". Each phase corresponds to a publicly known player known as the "leader", the role of leader being possibly played by several consecutive replicas during the same phase (as in "chained Hotstuff" M. Yin et al, PODC 2019), that may or not stay the same throughout the protocol. Termination in these protocols guarantees that, if from some point in time the leader is honest and the network fast enough, then all honest players will output in this phase. This is why both the bit communication complexity and latency to output, are traditionally measured from this particular moment in time. Indeed, nothing is guaranteed as long as both of these conditions are not satisfied.

In the model described in M. Yin et al, PODC 2019, it is observed that the communication complexity is so far at least quadratic in the number n of players since M. Castro et al, OSDI '99. It is written that "This scaling challenge plagues not only practical BFT (PBFT), but many other protocols developed since then, e.g., Prime, Zyzzyva (R. Kotla et al, ACM Trans. Comput. Syst 2009), Upright. BFT-SMaRt, 700BFT (P. Aublin et al, ACM Trans. Comput. Syst. 32, 4 2015), and scalable BFT (SBFT, Guy Golan-Gueta et al, CoRR 2018)." It is also observed that this complexity comes from the subprotocol denoted "view change" in PBFT, which "requires the new leader to relay [to all n players] information from (n−t)[players]". The main contribution of M. Yin et al, PODC 2019 is to circumvent this requirement, to achieve communication complexity linear in n.

However, the latency is somehow sacrificed, as it is written: "Hotstuff achieves these properties by adding another [round trip] to each [phase], a small price to latency in return for considerably simplifying the leader replacement protocol." This argument tends to show that this price is unavoidable, namely, previous protocols with better latency are mentioned: "Unfortunately, [phase]change based on the [two round trips] paradigm is far from simple, is bug-prone (I. Abraham et al. CoRR 2017), and incurs a significant communication penalty for even moderate system sizes." To further show that this price may be unavoidable, they insist that ways around preserving linear complexity and two-round trips latency do exist: Tendermint (E. Buchman, 2016), Casper (V. Buterin et al, CoRR 2017), and also the first version Hotstuffv1 (I. Abraham et al, CoRR 2018), but that all of these known methods sacrifice, on the other hand, another important property denoted "responsiveness", which guarantees output at the actual network's speed. Indeed, in I. Abraham et al, CoRR 2018, the leader is instructed to wait at the beginning of a phase for some fixed delay $\Delta$, which is the upper bound on the network delay after an unknown point in time, because their termination requires that the leader collects messages from all the honest players. This inefficiency is pointed in M. Yin et al. PODC 2019 as follows: "However, these systems are built around a synchronous core, where in proposals are made in pre-determined intervals that must accommodate the worst-case time it takes to propagate messages". Then, also in M. Yin et al, PODC 2019, it is emphasized that termination in the previous known systems would not be guaranteed without waiting for $\Delta$.

Patent U.S. Pat. No. 10,503,614 discloses a failure-free execution agreement that includes n parties acting as replicas, and a number of parties acting as clients, with one replica designated as a primary and at most F replicas presumed Byzantine faulty. The basic agreement protocol proceeds in three rounds: client sends a request to the primary, who sends to all replicas; each replica sends a threshold-part signature on hash to a first collector, the collector combines the threshold-parts into a single signature and sends to all replicas which then commit and send to a second collector. The client proceeds when a signed block of requests arrives from the second collector.

Patent U.S. Pat. No. 10,747,629 describes a method for implementing linear view-change with optimistic responsiveness in a BFT protocol running on a distributed system. It is the method described in M. Yin et al, *PODC* 2019. In this method, an extra round-trip of messages between leader and replicas is needed to achieve consensus.

Furthermore, these known methods rely on specific threshold signatures schemes (TSS) of either one of the following two categories. The first category, whose use is reported in the Libra BFT technical documentation 2019-10-24, is such that threshold signatures are appended with the identity of the signers (Boneh, Drijvers, Neven Asiacrypt 2018), and thus have linear size (O(n)). The second category, whose use is reported M. Yin et al, PODC 2019, is such that participants share a unique verification key. Thus this unique key is produced by a setup which is not transparent, for instance: a distributed key generation among replicas, which comes at the cost of communications cubic in the number of replicas (Abraham, Jovanovic et al Podc'21) or a setup by a trusted entity.

According to the state of the art & survey paper (Sui, Duan, Zhang 2022), in Table 1, no existing BFT protocol under partial synchrony guarantees simultaneously:—termination in 5 steps,—optimal resilience to t corruptions out of n=3t+1 participants,—linear (O(n)) authenticator complexity per view (denoted as "phase" thereafter) and—linear (O(n)) number of messages per view.

There is thus a need to overcome such drawbacks and to propose an efficient, fast and reliable method for implementing linear view-change with optimistic responsiveness in a Byzantine Fault Tolerant (BFT) protocol running on a distributed system.

SUMMARY

According to certain aspects of the disclosure, methods and systems are disclosed for implementing linear view-change with optimistic responsiveness in a Byzantine Fault Tolerant (BFT) protocol running on a distributed system.

According to a first aspect, the disclosure relates to a method for implementing linear view-change in a Byzantine Fault Tolerant (BFT) protocol running on a distributed system comprising n replicas, wherein no more than t of the n replicas are faulty, and wherein the BFT protocol enables the non-faulty replicas to agree on how to sequence execution of a plurality of service operations originating from one or more clients, the method comprising:

executing, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiating a view-change with at least the following steps:

if said current phase number $\varphi$ is different than 1, each replica $P_{i(i=1\ldots n)}$ sets $\varphi_i$ the highest phase number up to said current phase $\varphi$ for which said replica $P_i$ received said lock certificate associated with a value $I_i$, or each replica $P_{i(i=1\ldots n)}$ sets said phase number $\varphi_i$ equal to 0 if said replica did not receive any lock certificate; each replica $P_i$ sending to a leader replica $L_\varphi$ a message containing at least a report ($\varphi_i$, $\varphi$), appended with said lock certificate ($I_i$, $\varphi_i$) if $\varphi_i \geq 1$, and % or on the leader replica $L_\varphi$ side:

if said current phase number $\varphi$ is equal to 1, said leader replica $L_\varphi$ sets a value equal to an input I and sends a proposition message to the replicas including said value I, or if said current phase number $\varphi$ is different than 1, upon receiving messages from 2t+1 distinct replicas, with one such message from a replica $i_{max}$ containing a report ($\varphi_{imax},\varphi$) such that a phase number $\varphi_{max}$ is the highest phase number $\varphi_i$ out of the said 2+1 reports ($\varphi_i,\varphi$) received, a phase number $\varphi_{max}$ is then set equal to the phase number $\varphi_{imax}$ and a value $I_{max}$ is set equal to $I_{imax}$ the value contained in the lock certificate ($I_{imax}$, $\varphi_{imax}$) appended to the message from $i_{max}$, the leader replica $L_\varphi$ generating a message out of said 2t+1 distinct replicas, with:

(i) if said phase number $\varphi_{max}$ is greater than 0, said leader replica $L_\varphi$, having received at least one lock certificate $Lc_{max}(I_{max}, \varphi_{max})$, sends a proposition message ($I_{max}, \varphi, PnS(\varphi_{max}, \varphi)Lc_{max})$) to the replicas; or (ii) if said phase number $\varphi_{max}$ is equal to 0, said leader replica $L_\varphi$ sets the value I equal to an input $I_{mod}$ and sends a proposition message ($I_{mod}, \varphi, PnS(0,\varphi)$ ) to the replicas, in order to make the view-change effective in said distributed system.

According to another aspect, the disclosure relates to a non-transitory computer readable storage medium having stored thereon program code embodying a method for implementing linear view-change in a Byzantine Fault Tolerant (BFT) protocol running on a distributed system comprising n replicas, wherein no more than t of the n replicas are faulty, and wherein the BFT protocol enables the non-faulty replicas to agree on how to sequence execution of a plurality of service operations originating from one or more clients, the method comprising:

executing, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiating a view-change with at least the following steps:

if said current phase number $\varphi$ is different than 1, each replica $P_{i(i=1\ldots n)}$ sets $\varphi_i$ the highest phase number up to said current phase number $\varphi$ for which said replica $P_i$ received said lock certificate associated with a value $I_i$, or each replica $P_{i(i=1\ldots n)}$ sets said phase number $\varphi_i$ equal to 0 if said replica did not receive any lock certificate; each replica $P_i$ sending to a leader replica $L_\varphi$ a message containing at least a report($\varphi_i,\varphi$), appended with said lock certificate ($I_i$, $\varphi_i$) if $\varphi_i \geq 1$, and/or on the leader replica $L_\varphi$ side:

if said current phase number $\varphi$ is equal to 1, said leader replica $L_\varphi$ sets a value equal to an input I and sends a proposition message to the replicas including said value I, or if said current phase number p is different than 1, upon receiving messages from 2t+1 distinct replicas, with one such message from a replica $i_{imax}$ containing a report($\varphi_{imax}$, $\varphi$) such that a phase number $\varphi_{imax}$ is the highest phase number $\varphi_i$ out of the said 2t+1 reports ($\varphi_i$, $\varphi$) received, a phase number $\varphi_{max}$ is then set equal to the phase number $\varphi_{imax}$ and a value $I_{max}$ is set equal to $I_{max}$ the value contained in the lock certificate ($I_{imax}$, $\varphi_{imax}$) appended to the message from $i_{max}$, the leader replica $L_\varphi$ generating a message out of said 2t+1 distinct replicas, with:
- (i) if said phase number $\varphi_{max}$ is greater than 0, said leader replica $L_\varphi$ having received at least one lock certificate $Lc_{max}(I_{max},\varphi_{max})$, sends a proposition message ($I_{max}$,$\varphi$,PnS($\varphi_{max}$,$\varphi$), $Lc_{max}$) to the replicas; or
- (ii) if said phase number $\varphi_{max}$ is equal to 0, said leader replica $L_\varphi$ sets the value I equal to an input $I_{mod}$ and sends a proposition message ($I_{mod}$,$\varphi$,PnS(0,$\varphi$), ) to the replicas, in order to make the view-change effective in said distributed system.

According to yet another aspect, the disclosure relates to a distributed system comprising:

n replicas, and a non-transitory computer readable storage medium having stored thereon program code that, when executed, enables the distributed system to implement linear view-change in a Byzantine Fault Tolerant (BFT) protocol running on said distributed system, wherein no more than t of the n replicas are faulty, and wherein the BFT protocol enables the non-faulty replicas to agree on how to sequence execution of a plurality of service operations originating from one or more clients, the program code causing said distributed system to:

execute, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiate a view-change with at least the following steps:

if said current phase number p is different than 1, each replica $P_{i(i=1\ldots n)}$ sets $\varphi_i$ the highest phase number up to said current phase number $\varphi$ for which said replica $P_i$ received said lock certificate associated with a value $I_i$, or each replica $P_{i(i=1\ldots n)}$ sets said phase number $\varphi_i$ equal to 0 if said replica did not receive any lock certificate; each replica $P_i$ sending to a leader replica $L_\varphi$ a message containing at least a report($\varphi_i$,$\varphi$), appended with said lock certificate ($I_i$,$\varphi_i$) if $\varphi_i \geq 1$, and/or on the leader replica $L_\varphi$ side:

if said current phase number $\varphi$ is equal to 1, said leader replica $L_\varphi$ sets a value equal to an input I and sends a proposition message to the replicas including said value I, or if said current phase number $\varphi$ is different than 1, upon receiving messages from 2t+1 distinct replicas, with one such message from a replica $i_{max}$ containing a report($\varphi_{imax}$,$\varphi$) such that a phase number $\varphi_{imax}$ is the highest phase number $\varphi_i$ out of the said 2t+1 reports ($\varphi_i$, $\varphi$) received, a phase number $\varphi_{max}$ is then set equal to the phase number $\varphi_{imax}$ and a value $I_{max}$, is set equal to $I_{imax}$ the value contained in the lock certificate ($I_{imax}$, $\varphi_{imax}$) appended to the message from $i_{max}$, the leader replica $L_\varphi$, generating a message out of said 2t+1 distinct replicas, with:
- (i) if said phase number $\varphi_{max}$ is greater than 0, said leader replica $L_\varphi$, having received at least one lock certificate $Lc_{max}(I_{max},\varphi_{max})$, sends a proposition message ($I_{max}$,$\varphi$,PnS($\varphi_{max}$,$\varphi$), $Lc_{max}$) to the replicas; or
- (ii) if said phase number $\varphi_{max}$ is equal to 0, said leader replica $L_\varphi$ sets the value I equal to an input $I_{mod}$ and sends a proposition message ($I_{mod}$,$\varphi$,PnS(0,$\varphi$), ) to the replicas, in order to make the view-change effective in said distributed system.

According to another aspect, the disclosure relates to a method implementing linear view-change in a Byzantine Fault Tolerant (BFT) protocol running on a distributed system comprising n replicas, wherein no more than t of the n replicas are faulty, and wherein the BFT protocol enables at least 2t+1 of the n replicas to agree on how to sequence execution of a plurality of service operations originating from one or more clients, the method comprising:

executing, among and by the n replicas, a phase $\varphi$ of the BFT protocol, communicating instances of a lock certificate being associated with said phase; and if 2t+1 communicating instances of said lock certificate are not received by the n replicas within a predetermined timeout period, initiating a view-change with at least the following steps:

each replica $P_{i(i=1\ldots n)}$ sets $\varphi_i$ the highest phase number up to said current phase $\varphi$ for which said replica $P_i$ received said lock certificate associated with an input value $I_i$, or each replica $P_{i(i=1\ldots n)}$ sets said phase number $\varphi_i$ equal to 0 if said replica did not receive any lock certificate;

each replica $P_i$ sends to a leader replica $L_\varphi$ a report($\varphi_i$, $\varphi$), appended with a full lock certificate ($I_i$,$\varphi_i$) if $\varphi_i \geq 1$, and initiates an instance of an exclusivity protocol with respect to its respective input value $I_i$, the leader replica being the chosen prover L, said exclusivity protocol being a protocol that guarantees:
- (a) if either said prover L knows a valid value or at least t+1 non-faulty replicas have a valid input value, after a round-trip of messages between said prover L and the replicas, the prover L outputs a valid input $I_{select}$, and
- (b) after another round-trip of messages between said prover L and the replicas, the prover L outputs a report PoE($I_{select}$), the leader replica $L_\varphi$, upon receiving a set R of report messages from 2t+1 distinct replicas, with a phase number $\varphi_{max}$ set to be the highest phase number $\varphi_i$ received and associated with a value $I_{max}$:
- (i) if said phase number $\varphi_{max}$ is greater than 0, said leader replica $L_\varphi$, having received at least one full lock certificate $FLc_{max}(I_{max},\varphi_{max})$, sends a proposition message ($I_{max}$,$\varphi$,PnS($\varphi_{max}$,$\varphi$),$FLc_{max}$) to the replicas, with PnS($\varphi_{max}$,$\varphi$) a report generated by the leader replica $L_\varphi$ out of said 2t+1 distinct replicas; or
- (ii) if said phase number $\varphi_{max}$ is equal to 0, then said leader replica $L_\varphi$ selects said valid input $I_{select}$, in function of said exclusivity protocol, and sends a proposition message ($I_{select}$,$\varphi$,PnS(0,$\varphi$), ) to the replicas, in order to make the view-change effective in said distributed system.

According to another aspect, the disclosure relates to a non-transitory computer readable storage medium having stored thereon program code embodying a method for implementing linear view-change in a Byzantine Fault Tolerant (BFT) protocol running on a distributed system comprising n replicas, wherein no more than t of the n replicas are faulty, and wherein the BFT protocol enables at least 2t+1 of the n replicas to agree on how to sequence execution of a plurality of service operations originating from one or more clients, the method comprising:

executing, among and by the n replicas, a phase $\varphi$ of the BFT protocol, communicating instances of a lock certificate being associated with said phase; and if 2t+1 communicating instances of said lock certificate are not received by the n replicas within a predetermined timeout period, initiating a view-change with at least the following steps:

each replica $P_{i(i=1\ldots n)}$ sets $\varphi_i$ the highest phase number up to said current phase $\varphi$ for which said replica $P_i$ received said lock certificate associated with an input value $I_i$, or each replica $P_{i(i=1\ldots n)}$ sets said phase number $\varphi_i$ equal to 0 if said replica did not receive any lock certificate;

each replica $P_i$ sends to a leader replica $L_\varphi$ a report($\varphi_i$, $\varphi$), appended with a full lock certificate $(I_i,\varphi_i)$ if $\varphi_i \geq 1$, and initiates an instance of an exclusivity protocol with respect to its respective input value $I_i$, the leader replica being the chosen prover L, said exclusivity protocol being a protocol that guarantees:

(a) if either said prover L knows a valid value or at least t+1 non-faulty replicas have a valid input value, after a round-trip of messages between said prover L and the replicas, the prover L outputs a valid input $I_{select}$, and (b) after another round-trip of messages between said prover L and the replicas, the prover L outputs a report $PoE(I_{select})$.

the leader replica $L_\varphi$, upon receiving a set R of report messages from 2t+1 distinct replicas, with a phase number $\varphi_{max}$ set to be the highest phase number $\varphi_i$ received and associated with a value $I_{max}$:

(i) if said phase number $\varphi_{max}$ is greater than 0, said leader replica $L_\varphi$, having received at least one full lock certificate $FLc_{max}(I_{max},\varphi_{max})$, sends a proposition message $(I_{max},\varphi,PnS(\varphi_{max},\varphi),FLc_{max})$ to the replicas, with $PnS(\varphi_{max},\varphi)$ a report generated by the leader replica $L_\varphi$ out of said 2t+1 distinct replicas; or (ii) if said phase number $\varphi_{max}$ is equal to 0, then said leader replica $L_\varphi$ selects said valid input $I_{select}$, in function of said exclusivity protocol, and sends a proposition message $(I_{select},\varphi,PnS(0,\varphi),\ )$ to the replicas, in order to make the view-change effective in said distributed system.

According to yet another aspect, the disclosure relates to a distributed system comprising:

n replicas, and a non-transitory computer readable storage medium having stored thereon program code that, when executed, enables the distributed system to implement linear view-change in a Byzantine Fault Tolerant (BFT) protocol running on said distributed system, wherein no more than t of the n replicas are faulty, and wherein the BFT protocol enables at least 2t+1 of the n replicas to agree on how to sequence execution of a plurality of service operations originating from one or more clients, the program code causing said distributed system to:

execute, among and by the n replicas, a phase $\varphi$ of the BFT protocol, communicating instances of a lock certificate being associated with said phase; and if 2t+1 communicating instances of said lock certificate are not received by the n replicas within a predetermined timeout period, initiate a view-change with at least the following steps:

each replica $P_{i(i=1\ldots n)}$ sets $\varphi_i$ the highest phase number up to said current phase $\varphi$ for which said replica $P_i$ received said lock certificate associated with an input value $I_i$, or each replica $P_{i(i=1\ldots n)}$ sets said phase number $\varphi_i$ equal to 0 if said replica did not receive any lock certificate;

each replica $P_i$ sends to a leader replica $L_\varphi$ a report($\varphi_i$, $\varphi$), appended with a full lock certificate $(I_i,\varphi_i)$ if $\varphi_i \geq 1$, and initiates an instance of an exclusivity protocol with respect to its respective input value $I_i$, the leader replica being the chosen prover L, said exclusivity protocol being a protocol that guarantees:

(a) if either said prover L knows a valid value or at least t+1 non-faulty replicas have a valid input value, after a round-trip of messages between said prover L and the replicas, the prover L outputs a valid input $I_{select}$, and (b) after another round-trip of messages between said prover L and the replicas, the prover L outputs a report $PoE(I_{select})$, and the leader replica $L_\varphi$, upon receiving a set R of report messages from 2t+1 distinct replicas, with a phase number $\varphi_{max}$ set to be the highest phase number $\varphi_i$ received and associated with a value $I_{max}$:

(i) if said phase number $\varphi_{max}$ is greater than 0, said leader replica $L_\varphi$ having received at least one full lock certificate $FLc_{max}(I_{max},\varphi_{max})$, sends a proposition message $(I_{max},\varphi,PnS(\varphi_{max},\varphi),FLc_{max})$ to the replicas, with $PnS(\varphi_{max},\varphi)$ a report generated by the leader replica $L_\varphi$ out of said 2t+1 distinct replicas; or (ii) if said phase number $\varphi_{max}$ is equal to 0, then said leader replica $L_\varphi$ selects said valid input $I_{select}$, in function of said exclusivity protocol, and sends a proposition message $(I_{select},\varphi,PnS(0,\varphi),\ )$ to the replicas, in order to make the view-change effective in said distributed system.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Definitions

Consensus

In the detailed description herein, consensus protocols are considered for n players, also denoted replicas, in a distributed system, especially an asynchronous communication network, where no more than t replicas are maliciously corrupted, or faulty, the others being denoted as honest, or non-faulty. This number n of replicas may be larger or equal to 3t+1. The invention is described on the specific example of a number n=3t+1 replicas but is applicable in general to any n larger than or equal to 3t+1. A method to generalize the description below may consist in replacing the number 2t+1 every time where it appears, denoted as a "supermajority", by the number n−t.

The following definition can be used: let π be a protocol in which all in replicas supply an input value and outputs at most one output value. Then, π is called a consensus protocol if it satisfies the Consistency property: no two non-faulty replicas output different values; and the Consensus Weak Unanimity (CWU) property: if all n replicas are non-faulty and have the same input value, then this is the only value that they can possibly output (M. Ben-Or, *ACM SIGACT-SIGOPS* 1983).

A consensus has Strong Unanimity if, as soon as all non-faulty replicas have the same input value, then this is the only possible output. It can be noted that a consensus has an (optimistic) Fast Track if one further has the following property: if all replicas are non-faulty and have the same input, then all replicas output within two messages delay from the start of the execution.

The protocol proceeds in intervals denoted views or phases, and numbered as positive integers $\varphi=1,2,\ldots$. Each honest replica maintains a phase counter, the counters may not evolve at the same pace from one replica to another. For simplicity in the following description, it is assumed a model where all counters are synchronized, e.g. they may be controlled by a global clock. Given by the model, in each phase $\varphi \geq 1$, the publicly known identity of a replica is assumed, marked as a distinguished replica and denoted the leader replica $L_{100}$, a replica in the n replicas corresponding to a new proposer for the view-change. The invention applies also to systems where the identity of the leader replica may change within a phase, as for instance in the "chained Hotstuff" (Yin et al Podc'21).

In the detailed description herein, a round-trip has to be understood as a complete exchange of messages between the replicas.

In the detailed description herein, a view change has to be understood as a phase change.

In the detailed description herein, a k-threshold signature scheme (TSS), is the data of a secret algorithm for each participant that outputs a signature share on a message, in a way that signature shares are unforgeable; of a public algorithm enabling to check that signature shares are correctly computed, and of a public algorithm that aggregates k valid signature shares on the same message m into one signature, denoted "threshold signature" on m, such that it is unforgeable without knowledge of k signature shares on m. A TSS can be embodied from the said specific TSS mentioned above. It can also be embodied with transparent setup, as defined for example in T. Attema et al, Asiacrypt 2021, as follows. Considering a baseline digital signature scheme, a k-threshold signature provides, for any integer k, an algorithm $Aggregate_k$ which, on input a set S of k messages of identical content m, signed by any distinct k out of n replicas, outputs a proof of knowledge of such a set S, including the predicate that the k signers are distinct.

In the detailed description herein, a "report $(\varphi_i,\varphi)$" denotes any data that carries the information that this data is included in a message sent in phase $\varphi$, by a replica whose said set phase number was equal to $\varphi_i$ when it sent the message.

In the detailed description herein, a "proof PnS $(\varphi_{max},\varphi)$" denotes any data proving the following predicate: there exists t+1 honest replicas that, in phase $\varphi$, have their said set phase number lower than or equal to the phase number $\varphi_{max}$.

In the detailed description herein, "proving" denotes that there is a said verification algorithm, that outputs "true" on the said data if and only if the predicate is true.

In the detailed description herein, for a<=b integers and I a subset of [1 . . . n], we denote R_{S,[a,b]} a data proving knowledge of numbers w_i, such that each number w_i is signed by a replica i indexed in the set I, and such that the numbers w_i are all in the interval [a,b].

Miscellaneous

In the detailed description herein, references to "embodiment," "an embodiment," "one non-limiting embodiment.," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context.

For example, terms, such as "and", "or", or "and/or," as used herein can include a variety of meanings that man depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense.

Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

The terms "having," "including," "containing" and "comprising" or any other variation thereof, are interchangeable, and one of skill in the art will recognize that these terms are open ended terms. They are intended to cover a non-exclusive inclusion, such that a process, method, article, or apparatus that comprises a list of elements does not include only those elements but can include other elements not expressly listed or inherent to such process, method, article, or apparatus.

As used herein, the term "about" or "approximately" means within an acceptable error range for the particular value as determined by one of ordinary skill in the art, which will depend in part on how the value is measured or determined. i.e., the limitations of the measurement system.

Certain non-limiting embodiments are described below with reference to block diagrams and operational illustrations of methods, processes, devices, and apparatus. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Methods for Implementing Linear View-Change in a BFT Protocol

Responsive Linear View Change from any Proof of Non-Supermajority (PnS)

According to an aspect, the disclosure relates to a method for implementing linear view-change in a Byzantine Fault Tolerant (BFT) protocol running on a distributed system comprising n replicas, wherein no more than t of the n replicas are faulty, and wherein the BFT protocol enables the non-faulty replicas to agree on how to sequence execution of a plurality of service operations originating from one or more clients, the method comprising:

executing, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiating a view-change with at least the following steps:

if said current phase number $\varphi$ is different than 1, each replica $P_{i(i=1\ldots n)}$ sets $\varphi_i$ the highest phase number up to said current phase $\varphi$ for which said replica $P_i$ received said lock certificate associated with a value $I_i$, or each replica $P_{i(i=1\ldots n)}$, sets said phase number $\varphi_i$ equal to 0 if said replica did not receive any lock certificate: each replica $P_i$ sending to a leader replica $L_\varphi$ a message containing at least a report($\varphi_i,\varphi$), appended with said lock certificate $(I_i,\varphi_i)$ if $\varphi_i \geq 1$, and/or on the leader replica $L_\varphi$ side:

if said current phase number $\varphi$ is equal to 1, said leader replica $L_\varphi$ sets a value equal to an input I and sends a proposition message to the replicas including said value I, or if said current phase number $\varphi$ is different than 1, upon receiving messages from 2t+1 distinct replicas, with one such message from a replica $i_{max}$ containing a report ($\varphi_{imax},\varphi$) such that a phase number $\varphi_{imax}$ is the highest phase number $\varphi_i$ out of the said 2+1 reports ($\varphi_i,\varphi$) received, a phase number $\varphi_{max}$, is then set equal to the phase number $\varphi_{imax}$ and a value $I_{max}$, is set equal to $I_{imax}$ the value contained in the lock certificate $(I_{imax},\varphi_{imax})$ appended to the message from $i_{max}$, the leader replica $L_\varphi$ generating a message out of said 2t+1 distinct replicas, with:

(i) if said phase number $\varphi_{max}$ is greater than 0, said leader replica $L_\varphi$, having received at least one lock certificate $Lc_{max}(I_{max},\varphi_{max})$, sends a proposition message $(I_{max},\varphi,PnS(\varphi_{max},\varphi),Lc_{max})$ to the replicas; or (ii) if said phase number $\varphi_{max}$ is equal to 0, said leader replica $L_\varphi$ sets the value I equal to an input $I_{mod}$ and sends a proposition message $(I_{mod},\varphi,PnS(0,\varphi),\ )$ to the replicas, in order to make the view-change effective in said distributed system.

The communication bottleneck of PBFT lies in the sub-protocol, denoted as "view change", in which the leader replica forwards 2t+1 signed messages to each replica. Then, each replica checks that these 2t+1 messages satisfy some predicate, which is that no message content has value is greater than $\varphi_{max}$. In the invention, this is replaced by any responsive subprotocol, denoted as "PnS protocol" that enables replicas to check a generalized version of this predicate. The generalized predicate, denoted PnS, is that no t+1 honest replicas have their PnS protocol input numbers $\varphi_i$ higher than $\varphi_{max}$. Notice that in the use case of the invention, where such a PnS protocol is used for BFT view change, used with PnS protocol inputs $\varphi_i$ equal the highest received lock certificate, then, the predicate PnS guarantees that no 2t+1 replicas, i.e., no supermajority, can ever make a report ($\varphi',\varphi$) for some phase number $\varphi'$ strictly greater than $\varphi_{max}$. Since the number 2t+1, which is n-t in the general case, is also known as a "quorum", then PnS could also be named as "Proof of non-quorum".

The invention also allows reducing the latency, by at least two messages. Indeed, in the known methods, the latency was of seven messages before output (8 messages, if the first leader is faulty), while the invention brings a latency of 5 messages (6 messages, if the first leader is faulty).

The invention thus allows removing the so far quadratic bit communication cost of three desirable properties of consensus protocols with leaders: Responsiveness with Optimal latency, Optimistic Fast Track and Strong Unanimity. In addition, this is achieved simultaneously, with optimal corruption threshold.

In the case where said phase number $\varphi_{max}$ is greater than 0, said at least one lock certificate $Lc_{max}(I_{max},\varphi_{max})$ received by the leader replica $L_\varphi$ is associated with a value $I_{max}$ which became the new value for I. If said phase number $\varphi_{max}$ is equal to 0, the leader replica $L_\varphi$ sets itself the value I to an input $I_{mod}$. Said input $I_{mod}$ may be the same at the beginning of the phase, and advantageously is the own input value of the leader replica. Such input values satisfy some publicly checkable validity predicate, as described above, and are considered as "valid" inputs.

The first phase $\phi=1$ differs from the higher ones $\phi \geq 2$, in that it does not contain the first step, denoted "report". It can be noted that replicas in a phase $\phi$ perform the instructions of the method as soon as they can, and the numbered steps do not denote any waiting instruction.

Such a PnS protocol may be applied to the following embodiments: such as in PBFT SBFT, containing 2t+1 strings reports ($\varphi_i,\varphi$) sent by 2t+1 distinct replicas. Thus, they have a size linear in n the number of replicas. The invention as described in this section applies in particular to PnS protocols with size sublinear in n, some of which are exemplified below.

In an embodiment, the message generating by the leader replica contains at least a proof $PnS(\varphi_{max},\varphi)$, embodied as of proof of existence of 2t+1 reports ($\varphi_i,\varphi$) signed by 2t+1 replicas, including the phase numbers $\varphi_i$, which are all lower than or equal to the phase number $\varphi_{max}$.

In the known methods, the forwarding of the 2t+1 messages of R to all replicas, done in the step "propose" relative to the proposition messages, has quadratic bit complexity. This is removed thanks to the invention: the steps relative to the setting of $\varphi_i$ and to the proposition and lock vote messages contain a subprotocol whose purpose is to prove replicas that the value proposed in the step "propose" is such that it comes with a lock certificate formed in some phase $\phi'$, and that at most t non-faulty replicas could possibly have received lock certificates formed in phases strictly higher than $\phi'$.

Relatively to such a specific set of inputs $(\varphi_i, Ic_i)$, a PnS protocol as defined in the invention is advantageously one in which non-faulty replicas in phase $\varphi$ send one message to a designated leader $L_\varphi$ among them, such that, upon receiving 2t+1 well-formed messages, a honest leader, also called prover, is able to output a phase number $\varphi_{max} \leq \varphi$, a lock certificate $Lc_{max}$ relative to this phase, and a proof $PnS(\varphi_{max}, \varphi)$ as defined.

In an embodiment, for each non-faulty replica $P_i$ in the phase $\varphi$, with $\varphi_i \leq \varphi$ the highest phase number for which said replica $P_i$ received said lock certificate $(I_i, \varphi_i)$, each message sent by the replicas contains, along with a lock certificate in $\varphi_i$ if $1 \leq \varphi_i$, the following embodiment of report $(\varphi_i, \varphi)$, denoted as a "list of testimonies to be lower" with: for each integer value $\varphi^0 \in [\varphi_i, \ldots, \varphi]$, a data, which is signed using a threshold signature system $\sigma$ of threshold (2t+1), Said signed data is denoted "testimony($\varphi^0, \varphi$)", and carries the information that {the said phase number set by the sender in phase $\varphi$ is lower than or equal to $\varphi^0$}, the proof $PnS(\varphi_{max}, \varphi)$ being then embodied as a threshold signature with threshold 2t+1 on the testimony $(\varphi_{max}, \varphi)$, which guarantees that 2t+1 replicas signed it.

In such an embodiment, in said 2t+1-TSS $\sigma$, with $L_\varphi$ the prover associated to the phase $\varphi$, a PnS protocol as defined in the invention may include the following steps:

1 Every replica $P_i$ sends to $L_\varphi$ a report $(\varphi_i, \varphi)$ (along with a lock certificate in $\varphi_i$ if $1 \leq \varphi_i$) along with, for each integer value $\varphi^0 \in [\varphi_i, \ldots, \varphi]$, one testimony signed using said threshold signature system $\sigma$, of the form: "my locked phase number up to $\varphi$ is lower or equal to $\varphi^0$".

2 Upon receiving from 2t+1 replicas such well-formed messages, that is: containing a lock certificate for the claimed $\varphi_i$, a list of testimonies which is consistent with the claimed $\varphi_i$, and such that all the messages specify "up to $\varphi$" with $\varphi$ the current phase number. Then, define $\varphi_{max}$ the lowest value for which there exists 2t+1 identical testimonies: "my locked phase number up to $\varphi$ is lower or equal to $\varphi_{max}$". The leader $L_\varphi$ then:
  extracts this $\varphi_{max}$ and a lock certificate $Lc_{max}$ relative to $\varphi_{max}$ from one of the 2t+1 messages received (it has to be noted that the leader is always able to do so); and
  aggregates the 2t+1 testimonies with $\sigma$, which constitutes a PnS on $(\varphi_{max}, \varphi)$.

Such a protocol is a PnS protocol with respect to the locked phase numbers $(\varphi_{Plock}, Lc(\varphi_{Plock}))$ held by non-faulty replicas in the phase $\varphi$, and the PnS obtained consists of at most $\varphi$ signatures. In particular, it is of bit size independent of the number of replicas.

According to another embodiment, a PnS protocol as defined in the invention may include the following steps:

1. Every replica $P_i$ sends to $L_\varphi$ a report $(\varphi_i, \varphi)$ (along with a lock certificate in $\varphi_i$ if $1 \leq \varphi_i$) along with a signature $\sigma_i$ on $\varphi_i$ generated using the algorithm AS.SignShare of (Giridharan et al 2021),
2. Upon receiving from 2t+1 replicas such well-formed messages, that is:
   i) containing a lock certificate for the claimed number $\varphi_i$,
   ii) a signature $\sigma_i$ on number $\varphi_i$ such that $\sigma_i$ verifies the last line "Check" of algorithm AS.VerifyShare of (Giridharan et al 2021).
   iii) and such that all n public keys are published with a valid proof of possession ("PoP", not necessarily the one specified by (Giridharan et al 2021)), then, define $\varphi_{max}$ the highest value among the numbers $\varphi_i$ reported in the 2t+1 well-formed report messages, then a PnS on $(\varphi_{max}, \varphi)$ is constituted by the output of algorithm AS.Agg of (Giridharan et al 2021) applied on the 2t+1 signatures $\sigma_i$.

The method according to the invention does not have a higher complexity than the known methods.

According to an embodiment, each replica $P_{i(i=1 \ldots n)}$, upon receiving said proposition message $(I_{mod}, \varphi, PnS(0,\varphi))$ or $(I_{max}, \varphi, PnS(\varphi_{max},\varphi), Lc_{max})$ from the leader replica $L_\varphi$ for the first time in the phase $\varphi$, replies with a signed lock vote message $(I_{mod}, \varphi)$ or $(I_{max}, \varphi)$.

According to an embodiment, said lock certificate is a (2t+1)-threshold signature on said lock vote message.

According to an embodiment, the leader replica $L_\varphi$, upon receiving 2t+1 lock vote messages for the same $(I_{mod}, \varphi)$ or $(I_{max}, \varphi)$, issues from said lock vote messages a lock certificate $(I_{mod}, \varphi)$ or $(I_{max}, \varphi)$, which said leader replica $L_\varphi$ sends along with said input $I_{mod}$ or $I_{max}$.

According to an embodiment, each replica $P_{i(i=1 \ldots n)}$, upon receiving from the leader replica $L_\varphi$ a lock certificate $(I_{mod}, \varphi)$ or $(I_{max}, \varphi)$ for the first time in the phase $\varphi$, whatever the input I, replies with a signed decision vote message $(I_{mod}, \varphi)$ or $(I_{max}, \varphi)$.

According to an embodiment, the leader replica $L_\varphi$, upon receiving decision vote messages $(I_{mod}, \varphi)$ or $(I_{max}, \varphi)$ from 2t+1 distinct replicas for the same value $I_{mod}$ or $I_{max}$, issues from said decision vote messages a decision certificate $(I_{mod})$ or $(I_{max})$, which is sent by said leader replica $L_\varphi$ to the replicas in order to make the view-change effective in said distributed system, and, upon receiving said decision certificate for the value $I_{mod}$ or $I_{max}$, each replica outputs the chosen value $I_{mod}$ or $I_{max}$.

According to an embodiment, only one lock certificate associated to one phase is formed.

According to an embodiment, in each phase $\phi \geq 1$, the leader $L_\phi$ is a publicly known replica, being for example selected at random among n replicas. Then, since less than one third of the replicas are corrupt, thus the expected number of phases until an honest leader replica $L_\phi$ is selected, is lower than 1.5.

The method according to the invention may be applied to improve the latency of consensus protocols, as the recent consensus protocol published by Facebook (https://arxiv.orgpdf/2103.03181.pdf), which is faster but has quadratic message complexity.

In a variant and optimized method, in a step called "alternative condition", the if condition for replicas to send a lock vote message is strictly relaxed, in that replicas also send a lock vote if their highest phase number for which they have a lock is at least as high as the lock certificate received from the leader. This is the rule for voting applied in (Buchman 2016), (Abraham Gueta Malkhi 2018) and (Giridharan et al 2021).

In a step called "restriction of communication", a leader sends a PnS only to replicas for which it received a report message after it sent the proposition message, and which report a strictly higher lock certificate than the one sent in the report message.

The benefits of the said "alternative condition" is that it saves on computation complexity, since replicas do not have to check a PnS, unless in the rare event where the leader would not have the highest lock certificate. The benefits of the restriction b) is that it saves on communication complexity since the leader does not send a PnS, unless is the rare event where a replica would report, in a message arriving late, a strictly higher lock certificate than in all 2t+1 reports previously received by the leader.

It is to be noticed that a variant of the said "restriction on communication" is proposed in (Giridharan et al 2021), under the name "optional unlocking". There, the leader waits to receive a message of the form "NAck" in response of its proposition message, before it sends a PnS to the sender of the "NAck "message. Hence, this variant has one more round-trip of communication compared to the said "restriction on communication" described here.

The method may comprise:
- each replica $P_{i(i=1\ldots n)}$ sets $\varphi_i$ the highest phase number up to said current phase $\varphi$ for which said replica $P_i$ received said Lc(input value $I_i$, phase number $\varphi_i$) or each replica $P_{i(i=1\ldots n)}$ sets said phase number $\varphi_i$ equal to 0 if said replica did not receive any Lc;
- each replica $P_i$ sends to a leader replica $L_\varphi$ a report($\varphi_i,\varphi$), appended with a Lc($I_i,\varphi_i$) if $\varphi_i \geq 1$
- said "restriction on communication": the leader replica $L_\varphi$, upon receiving a set R of report messages from 2t+1 distinct replicas, with a phase number $\varphi_{max}$ set to be the highest phase number $\varphi_i$ received and associated with a value $I_{max}$:
  (i) if said phase number $\varphi_{max}$ is greater than 0, said leader replica $L_\varphi$, having received at least one $Lc_{max}(I_{max},\varphi_{max})$, sends a proposition message $(I_{max},\varphi,Lc(I_{max},\varphi_{max}))$ to the replicas, or,
  (ii) if said phase number $\varphi_{max}$ is equal to 0, said leader replica sets the value I equal to an input $I_{mod}$ and sends a proposition message $(I_{mod},\varphi,\bot)$ to the replicas, in order to make the view-change effective.
- said "restriction on communication": the leader replica $L_\varphi$, only in the situation where: {it has sent a proposition message with a lock certificate $Lc_{max}(I_{max},\varphi_{max})$, and it receives from some replica $P_i$ a report($\varphi_i,\varphi$) message with a phase number $\varphi_i$ strictly higher than $\varphi_{max}$}: then leader replica replies to the replica with a PnS($\varphi_{max},\varphi$)
- said "alternative condition": each replica $P_{i(i=1\ldots n)}$, upon receiving said proposition message $(I_{max},\varphi,Lc(I_{max},\varphi_{max}))$ or $(I_{mod},\varphi,\bot)$ from the leader replica $L_\varphi$ for the first time in the phase $\varphi$, if the said set phase number $\varphi_i$ is lower than or equal to said phase number $\varphi_{max}$ contained in the proposed Lc($I,\varphi_{max}$) if any, or than 0 if no Lc is included in the proposition, replies with a signed lock vote message $(I_{mod},\varphi)$ or $(I_{max},\varphi)$.
  i) if the said set phase number $\varphi_i$ is lower than or equal to said phase number $\varphi_{max}$ contained in the proposed Lc($I,\varphi_{max}$) if any, or than 0 if no Lc is included in the proposition;
  ii) [said "alternative condition"] or if it also received a PnS($\varphi_{max},\varphi$);

then it replies with a signed lock vote message $(I_{mod},\varphi)$ or $(I_{max},\varphi)$.

the leader replica $L_\varphi$, upon receiving a set of 2t+1 lock votes for said value I:
(iii) forms a lock certificate(I,$\varphi$), shortened as "Lc", consisting of the aggregation of the 2t+1 signatures on said signed lock votes, into a threshold signature, then sends it to the replicas.

replica $P_{i(i=1\ldots n)}$, upon receiving from the leader replica $L_\varphi$ a Lc(I,$\varphi$) for the first time in the phase $\varphi$, whatever the value I, replies with a signed decision vote message.

The features described above in relation to claim 1 apply as well to this variant.

Proof of exclusivity (PoE)

According to another aspect, the disclosure relates to a method for implementing linear view-change in a Byzantine Fault Tolerant (BFT) protocol running on a distributed system comprising n replicas, wherein no more than t of the n replicas are faulty, and wherein the BFT protocol enables at least 2t+1 of the n replicas to agree on how to sequence execution of a plurality of service operations originating from one or more clients, the method comprising:

executing, among and by the n replicas, a phase $\varphi$ of the BFT protocol, communicating instances of a lock certificate being associated with said phase; and if 2t+1 communicating instances of said lock certificate are not received by the n replicas within a predetermined timeout period, initiating a view-change with at least the following steps:
- each replica $P_{i(i=1\ldots n)}$ sets $\varphi_i$ the highest phase number up to said current phase $\varphi$ for which said replica $P_i$ received said lock certificate associated with an input value $I_i$, or each replica $P_{i(i=1\ldots n)}$ sets said phase number $\varphi_i$ equal to 0 if said replica did not receive any lock certificate;
- each replica $P_i$ sends to a leader replica $L_\varphi$ a report($\varphi_i,\varphi$, appended with a full lock certificate $(I_i,\varphi_i)$ if $\varphi_i \geq 1$, and initiates an instance of an exclusivity protocol with respect to its respective input value h, the leader replica being the chosen prover L, said exclusivity protocol being a protocol that guarantees:
  (a) if either said prover L knows a valid value or at least t+1 non-faulty replicas have a valid input value, after a round-trip of messages between said prover L and the replicas, the prover L outputs a valid input $I_{select}$ and
  (b) after another round-trip of messages between said prover L and the replicas, the prover L outputs a report PoE($I_{select}$),
- the leader replica $L_\varphi$, upon receiving a set R of report messages from 2t+1 distinct replicas, with a phase number $\varphi_{max}$ set to be the highest phase number $\varphi_i$ received and associated with a value $I_{max}$:
  (i) if said phase number $\varphi_{max}$ is greater than 0, said leader replica $L_\varphi$, having received at least one full lock certificate $FLc_{max}(I_{max},\varphi_{max})$, sends a proposition message $(I_{max},\varphi,PnS(\varphi_{max},\varphi),FLc_{max})$ to the replicas, with PnS($\varphi_{max},\varphi$) a report generated by the leader replica $L_\varphi$ out of said 2t+1 distinct replicas; or
  (ii) if said phase number $\varphi_{max}$ is equal to 0, then said leader replica $L_\varphi$ selects said valid input $I_{select}$, in function of said exclusivity protocol, and sends a proposition message $(I_{select},\varphi,PnS(0,\varphi),\ )$ to the replicas, in order to make the view-change effective in said distributed system.

According to an embodiment, during an instance of the proof of exclusivity protocol, a value I satisfies a condition denoted the Exclusivity Predicate if and only if no other value I' is a unanimous input of non-faulty replicas, a report PoE(I) being a proof that I satisfies said condition of Exclusivity Predicate.

An example of such an exclusivity protocol is described in § 5.1.2 of https://eprint.iacr.org/2020/1480 version 25 Nov. 2020.

The proof of exclusivity protocol may be expressed as followed: every non-faulty replica starts with an input value in some integer range, appended with a certificate of validity that can be publicly checked, this predicate especially being denoted as "certificate" and consisting in the signatures of n-t replicas. A 3-move asynchronous protocol begins between the replicas with any prover, that enables: after the first move, the prover outputs a value I carrying a valid certificate, after the third move, the prover outputs a proof that no more than t non-faulty replicas have the same input value I', except possibly for I'=I.

Such an exclusivity protocol, and thus a consensus, may be achieved with better complexity, but without being responsive: each round takes a fixed time, whatever the speed of the network of the distributed system.

A full lock certificate $(v,\varphi)$ is the concatenation of a lock certificate $(v,\varphi)$ and of a PoE(v).

According to an embodiment, a proof of exclusivity PoE(v) of a value v, relative to a publicly known fixed tag, proves knowledge of one of the two following cases:

(i) either of a set $I \subset \{1, \ldots, n\}$ of t+1 distinct indices, together with a signature from each replica $i \in I$ for the message (v, tag).

(ii) or of a set S of 2 t+1 messages $(v_j, \text{tag})$ for $j=1, \ldots, 2t+1$, each signed by a distinct replica, such that no value $v_j$ repeats identically in strictly more than 1 messages.

According to an embodiment, the proof of knowledge in if the prover is in the case (i), where some value v repeats t+1 times, then said prover proves this with a (t+1)-threshold signature on v According to an embodiment, if the prover is in the case (ii), where no value repeats more than t times in S, the prover proves knowledge of a decomposition of S into three disjunct nonempty subsets of values, with repetitions: $S=S_{low} \cup \{v_{med}\} \cup S_{high}$, all of cardinalities at most t, and such that all values in the subset $S_{low}$ are strictly smaller than the value $v_{med}$, and proves that the value $v_{med}$ is itself strictly smaller than all values in the subset $S_{high}$.

This output is advantageously a PoE(v). The data provided by the prover implies knowledge of some set S' of 2t+1 pairs $(v_i, \text{tag})$ signed by distinct replicas, such that the values $v_i$ are organized in three nonempty subsets which are disjunct, each of cardinality at most t. Thus no value $v_i$ repeats identically more than t times in S'.

According to an embodiment, the exclusivity protocol has a complexity of O(nlog(n)), with n the number of replicas. The known methods have a latency of 3 messages before the output in an execution without corruption, but with a communication complexity of $O(n^2|TSS|)$.

According to an embodiment, each replica $P_{i(i=1\ldots n)}$, upon receiving said proposition message $(I_{select}, \varphi, PnS(0,\varphi), \square)$ from the leader replica $L_\varphi$ for the first time in the phase $\varphi$, replies with a signed lock vote message $(I_{select}, \varphi)$.

According to an embodiment, upon receiving 2t+1 lock vote messages for the same $(I_{select}, \varphi)$ and with:

i) if the prover L already had a full lock certificate associated with its value $I_i$, the prover L extracts a report $PoE(I_i)$ according to the exclusivity protocol, or ii) the prover L had selected a valid input $I_{select}$ in the previous instance of the exclusivity protocol, and has a valid report $PoE(I_{select})$.

the leader replica $L_\varphi$ aggregates the 2t+1 lock vote messages $(I_{select}, \varphi)$, and appends them with said PoE obtained at step i) or step ii), to issue a full lock certificate $(I_{select}, \varphi)$, which said leader replica $L_\varphi$ sends along with said selected input $I_{select}$.

According to an embodiment, each replica $P_{i(i=1\ldots n)}$, upon receiving from the leader replica $L_\varphi$ a full lock certificate $(I_{select}, \varphi)$ for the first time in the phase $\varphi$, whatever the input I, replies with a signed decision vote message $(I_{select}, \varphi)$.

According to an embodiment, the leader replica $L_\varphi$, upon receiving decision vote messages $(I_{select}, \varphi)$ from 2t+1 distinct replicas for the same value $I_{select}$, issues from said decision vote messages a decision certificate $(I_{select})$, which is sent by said leader replica $L_\varphi$ to the replicas in order to make the view-change effective in said distributed system, and, upon receiving said decision certificate for the value $I_{select}$, each replica outputs the chosen value $I_{select}$ and continues said exclusivity protocol.

This aspect of the invention is applicable to any possible consensus protocol that offers other trade-offs in security, such as allowing 3 messages of latency even if up to a number c of replicas are faulty, at the price of tolerating less corruption threshold: $n \geq 3t+2c-1$.

Devices & Computer-Implemented Methods & Mediums

The Provided Methods are Advantageously Computer-Implemented Methods.

Hence, in one embodiment, the provided methods for implementing linear view-change with optimistic responsiveness in a Byzantine Fault Tolerant (BFT) protocol running on a distributed system can be achieved either offline, i.e., not controlled by a device such as a computer-aided system; or alternatively online, i.e. controlled by a computer-aided system, such as one including a device suitable for implementing linear view-change with optimistic responsiveness in a Byzantine Fault Tolerant (BFT) protocol running on a distributed system, and having means adapted to execute the steps of the said methods; or alternatively both offline and online.

The disclosure hence relates to the non-transitory computer readable storage media and distributed systems as disclosed above.

The features described above for the methods according to the invention apply to the non-transitory computer readable storage media and the distributed systems.

A computer-aided system of the disclosure typically includes one or more user interface(s) enabling entry of an input data.

Embodiments of the disclosure and all of the functional operations described in this specification can be implemented in digital electronic circuitry, or in computer software, firmware, or hardware, including the structures disclosed in this specification and their structural equivalents, or in combinations of one or more of them. Embodiments of the disclosure can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus"

encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network A computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices. e.g., EPROM. EEPROM, and flash memory devices; magnetic disks, e.g., internal hard disks or removable disks; magneto-optical disks; and CD-ROM and DVD-ROM disks.

Embodiments of the disclosure can be implemented in a computing system that can include a back-end component, e.g., as a data server, or that can include a middleware component, e.g., an application server, or that can include a front-end component. e.g., a client computer having a graphical user interface or a Web browser through which a user can interact with an implementation of the disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

EXAMPLES

Example 1

Figure 1:
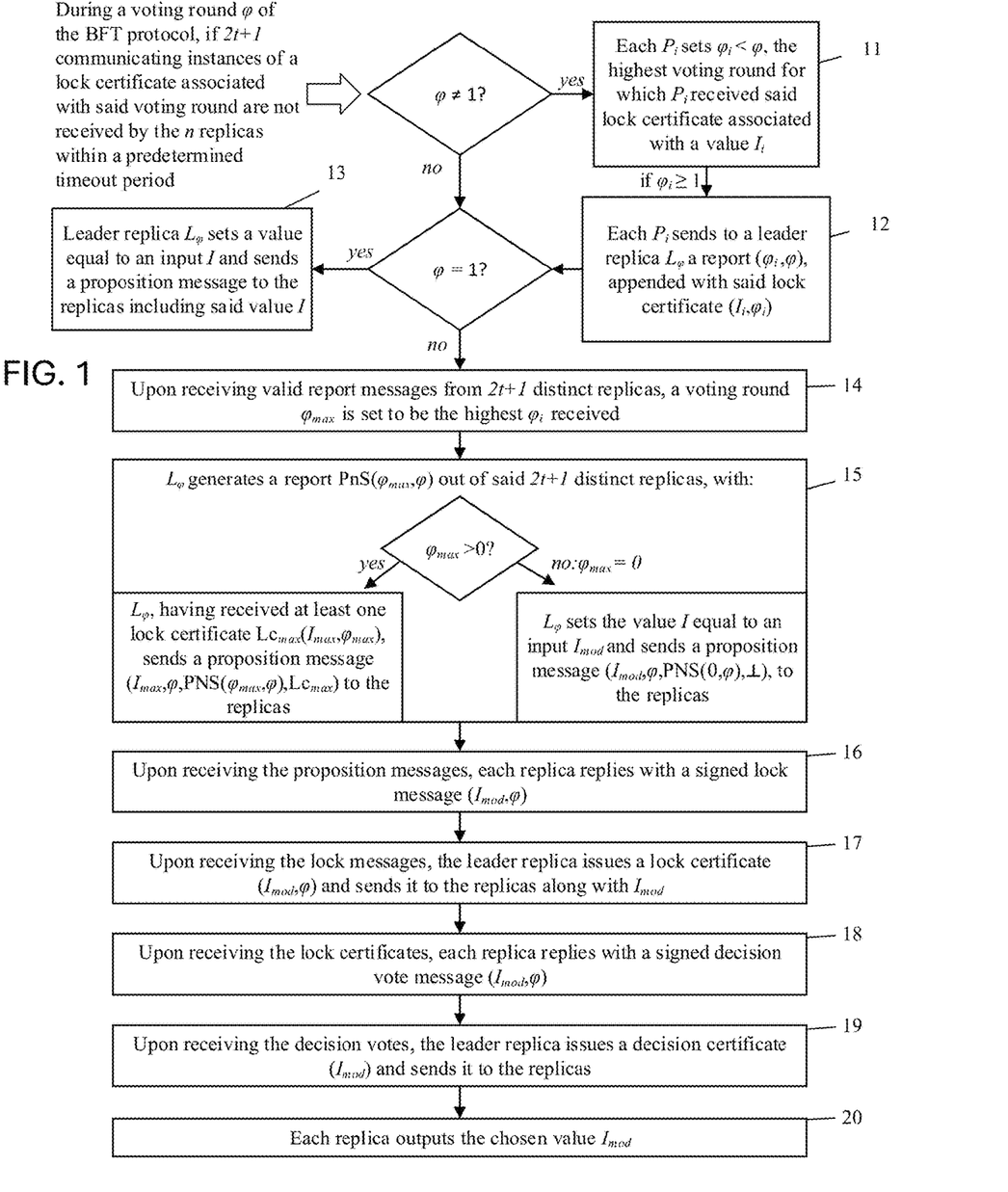
FIG. 1 depicts a flowchart of a first exemplary method for implementing linear view-change in a BFT protocol running on a distributed system.

Various steps in a first example of a method, according to the disclosure, for implementing linear view-change in a BFT protocol running on a distributed system are depicted in FIG. 1 and will be described in detail in what follows.

Said distributed system comprises n replicas, with no more than t of the n replicas being faulty, the BFT protocol enabling at least 2t+1 of the n replicas to agree on how to sequence execution of a plurality of service operations originating from one or more clients.

During the execution, among and by the n replicas, of a phase V of the BFT protocol, with communicating instances of a lock certificate being associated with said phase, if 2t+1 communicating instances of said lock certificate are not received by the n replicas within a predetermined timeout period, the method initiates a view-change with at least the following illustrated steps.

In a step 11, if said current phase number $\varphi$ is different than 1, each replica $P_{i(i=1\ldots n)}$ sets $\varphi_i$ the highest phase number up to said current phase number $\varphi$ for which said replica $P_i$ received said lock certificate associated with a value $I_i$. If a replica did not receive any lock certificate, said replica $P_{i(i=1\ldots n)}$ sets said phase number $\varphi_i$ equal to 0. In a step 12, if $\varphi_i \geq 1$, each replica $P_i$ sending to a leader replica $L_\varphi$ a message containing at least a report($\varphi_i,\varphi$), appended with said lock certificate ($I_i,\varphi_i$).

On the leader replica $L_\varphi$ side, in a step 13, if said current phase number $\varphi$ is equal to 1, said leader replica $L_\varphi$ sets a value equal to an input I and sends a proposition message to the replicas including said value I. Otherwise, if said current phase number $\varphi$ is different than 1, upon receiving valid report messages from 2t+1 distinct replicas, a phase number $\varphi_{max}$ is set to be the highest $\varphi_i$ received in a step 14, associated with a value $I_{max}$.

In a step 15, the leader replica $L_\varphi$ generates a message containing at least a proof $PnS(\varphi_{max},\varphi)$ out of said 2t+1 distinct replicas, depending on the value of $\varphi_{max}$. Indeed, if said phase number $\varphi_{max}$ is greater than 0, said leader replica $L_\varphi$, having received at least one lock certificate $Lc_{max}(I_{max},\varphi_{max})$, sends a proposition message ($I_{max},\varphi PnS(\varphi_{max},\varphi)$, $Lc_{max}$) to the replicas. Otherwise, if said phase number $\varphi_{max}$ is equal to 0, said leader replica $L_\varphi$ value I equal to an input $I_{mod}$ and sends a proposition message ($I_{mod},\varphi,PnS(0,\varphi),\square$) to the replicas. The view-change is thus effective in the distributed system.

In a step 16, each replica $P_{i(i=1\ldots n)}$, upon receiving said proposition message ($I_{mod},\varphi PnS(0,\varphi),\square$) from the leader replica $L_\varphi$ for the first time in the phase $\varphi$, replies with a signed lock vote message ($I_{mod},\varphi$). Then, in a step 17, the leader replica $L_\varphi$, upon receiving 2t+1 lock vote messages for the same ($I_{mod},\varphi$), issues from said lock vote messages a lock certificate ($I_{mod},\varphi$), which said leader replica $L_\varphi$ sends along with said input $I_{mod}$.

In a step 18, each replica $P_{i(i=1\ldots n)}$, upon receiving from the leader replica $L_\varphi$ a lock certificate ($I_{mod},\varphi$) for the first time in the phase $\varphi$, whatever the input I, replies with a signed decision vote message ($I_{mod},\varphi$). In a step 19, the leader replica $L_\varphi$, upon receiving decision vote messages ($I_{mod},\varphi$) from 2t+1 distinct replicas for the same value $I_{mod}$, issues from said decision vote messages a decision certificate ($I_{mod}$), which is sent by said leader replica $L_\varphi$ to the replicas in order to make the view-change effective in said distributed system.

In a step 20, each replica outputs the chosen value $I_{mod}$.

Example 2

Figure 2:
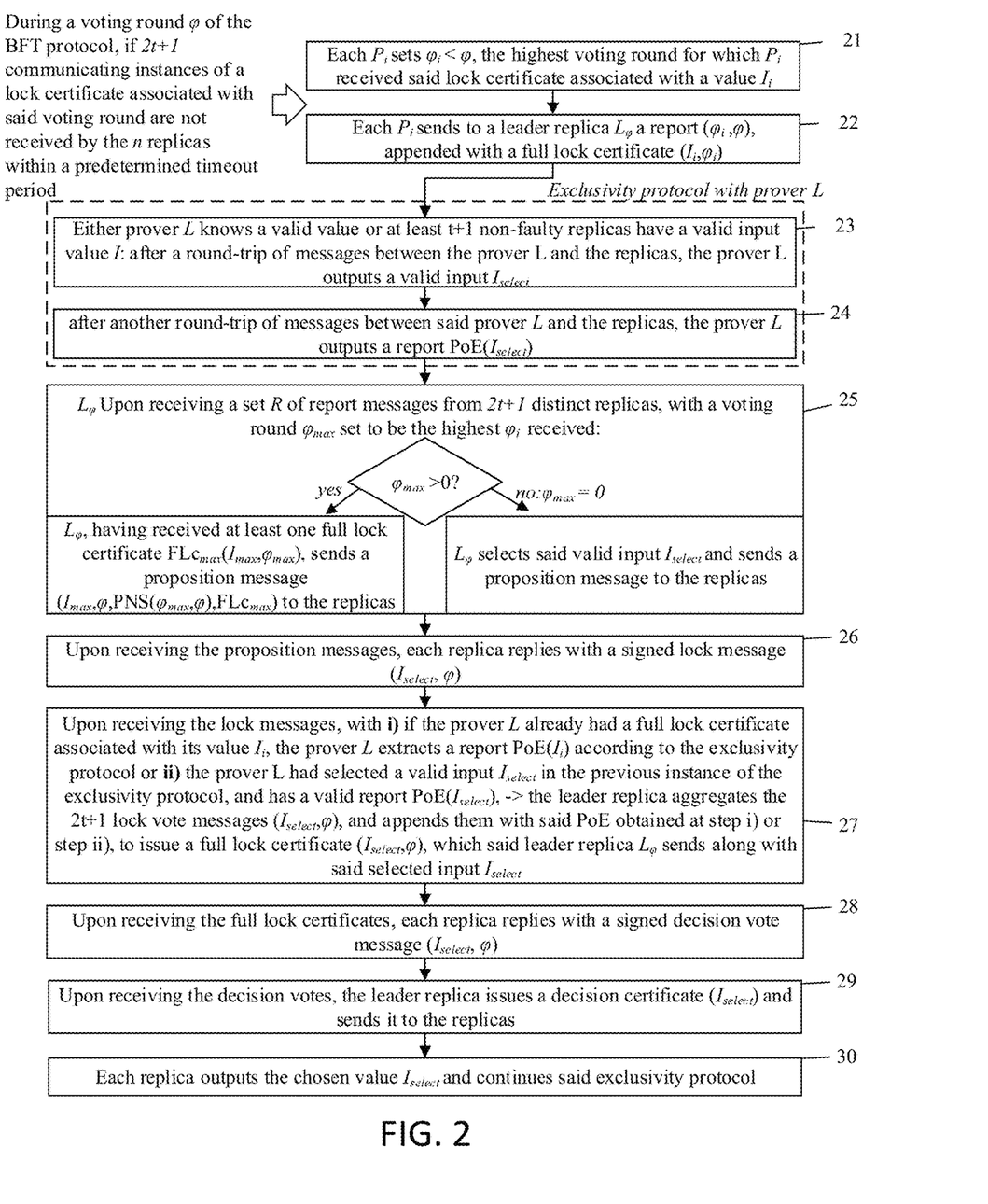
FIG. 2 depicts a flowchart of a second exemplary method for implementing linear view-change in a BFT protocol running on a distributed system.

Various steps in a second example of a method, according to the disclosure, for implementing linear view-change in a BFT protocol running on a distributed system are depicted in FIG. 2 and will be described in detail in what follows.

This example uses an exclusivity protocol as described above. In a step 21, each replica $P_{i(i=1\ldots n)}$ sets $\varphi_i$ the highest phase number up to said current phase number $\varphi$ for which said replica $P_i$ received said lock certificate associated with an input value $I_i$. Each replica $P_{i(i=1...n)}$ sets said phase number $\varphi_i$ equal to 0 if said replica did not receive any lock certificate.

In a step 22, each replica $P_i$ sends to a leader replica $L_\varphi$ a report($\varphi_i,\varphi$), appended with a full lock certificate ($I_i,\varphi_i$) if $\varphi_i \geq 1$, and initiates an instance of an exclusivity protocol with respect to its respective input value $I_i$, one of the replicas being a chosen prover L.

Said exclusivity protocol being a protocol that guarantees: (a) (step 23) if either said prover L knows a valid value or at least t+1 non-faulty replicas have a valid input value, after a round-trip of messages between said prover L and the replicas, the prover L outputs a valid input $I_{select}$, and (b) (step 24) after another round-trip of messages between said prover L and the replicas, the prover L outputs a report $PoE(I_{select})$.

In a step 25, upon receiving a set R of report messages from 2t+1 distinct replicas, with a phase number $\varphi_{max}$ set to be the highest $\varphi_i$ received and associated with a value $I_{max}$, said leader replica $L_\varphi$, if said phase number $\varphi_{max}$ is greater than 0, having received at least one full lock certificate $FLc_{max}(I_{select},\varphi_{max})$, sends a proposition message ($I_{max},\varphi$, $PnS(\varphi_{max},\varphi),FLc_{max}$) to the replicas, with $PnS(\varphi_{max},\varphi)$ a report generated by the leader replica $L_\varphi$ out of said 2t+1 distinct replicas. Otherwise, if said phase number $\varphi_{max}$ is equal to 0, in function of said exclusivity protocol, said leader replica $L_\varphi$ selects said valid input $I_{select}$, and sends a proposition message ($I_{select},\varphi,PnS(0,\varphi)$, ) to the replicas, in order to make the view-change effective in said distributed system.

In this example, during an instance of the exclusivity protocol, a value I satisfies a condition denoted the Exclusivity Predicate if and only if no other value I' is a unanimous input of non-faulty replicas, a report PoE(I) being a proof that I satisfies said condition of Exclusivity Predicate.

In a step 26, each replica $P_{i(i=1...n)}$, upon receiving said proposition message ($I_{select},\varphi,PnS(0,\varphi)$, ) from the leader replica $L_\varphi$ for the first time in the phase $\varphi$, replies with a signed lock vote message ($I_{select},\varphi$).

In a step 27, upon receiving 2t+1 lock vote messages for the same ($I_{select},\varphi$) and with a step i) if the prover L already had a full lock certificate associated with its value $I_i$, the prover L extracts a report $PoE(I_i)$ according to the exclusivity protocol, or a step ii) the prover L had selected a valid input $I_{select}$ in the previous instance of the exclusivity protocol, and has a valid report $PoE(I_{select})$, the leader replica $L_\varphi$ aggregates the 2t+1 lock vote messages ($I_{select},\varphi$), and appends them with said PoE obtained at step i) or step ii), to issue a full lock certificate($I_{select},\varphi$), which said leader replica $L_\varphi$ sends along with said selected input $I_{select}$.

In a step 28, each replica $P_{i(i=1...n)}$, upon receiving from the leader replica $L_\varphi$ a full lock certificate ($I_{select},\varphi$) for the first time in the phase $\varphi$, whatever the input I, replies with a signed decision vote message ($I_{select},\varphi$).

In a step 29, the leader replica $L_\varphi$, upon receiving decision vote messages ($I_{select},\varphi$) from 2t+1 distinct replicas for the same value $I_{select}$, issues from said decision vote messages a decision certificate ($I_{select}$), which is sent by said leader replica $L_\varphi$ to the replicas in order to make the view-change effective in said distributed system. In a step 30, upon receiving said decision certificate for the value $I_{select}$, each replica outputs the chosen value $I_{select}$ and continues said exclusivity protocol.

It should be appreciated that in the above description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some, but not other features included in other embodiments, combinations of features of different embodiments are meant to be within the scope of the disclosure, and form different embodiments, as would be understood by those skilled in the art.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

REFERENCES

Christian Badertscher, Ueli Maurer, Daniel Tschudi, and Vassilis Zikas. 2017. Bitcoin as a Transaction Ledger: A Composable Treatment. In *Advances in Cryptology-CRYPTO 2017-37th Annual International Cryptology Conference*, Santa Barbara. Calif., USA, Aug. 20-24, 2017, *Proceedings, Part* 1 Springer, 324-356.

Michael Ben-Or, 1983, Another Advantage of Free Choice: Completely Asynchronous Agreement Protocols (Extended Abstract). In *Proceedings of the Second Annual ACM SIGACT-SIGOPS Symposium on Principles of Distributed Computing*. Montreal, Quebec, Canada. Aug. 17-19, 1983. ACM, 27-30.

Cynthia Dwork, Nancy A. Lynch, and Larry J. Stockmeyer. 1988. Consensus in the presence of partial synchrony. *J. ACM* (1988).

Michael J. Fischer, Nancy A. Lynch, and Mike Paterson. 1985. Impossibility of Distributed Consensus with One Faulty Process. *J. ACM* 32, 2 (1985), 374-382.

Peter Gazi, Aggelos Kiayias, and Alexander Russell. 2020. Tight Consistency bounds for Bitcoin. In *Proceedings of the 2020 ACM SIGSAC Conference on Computer and Communications Security*.

Leslie Lamport, Robert E. Shostak, and Marshall C. Pease. 1982. The Byzantine Generals Problem. *ACM Trans. Program. Lang. Syst.* (1982).

Christian Cachin, Klaus Kursawe, Frank Petzold, and Victor Shoup. 2001. Secure and Efficient Asynchronous Broadcast Protocols. In *Advances in Cryptology CRYPTO 2001, 21st Annual International Cryptology Conference*, Santa Barbara, California, USA. Aug. 19-23, 2001, *Proceedings* (*Lecture Notes in Computer Science*, Vol. 2139). Springer, 524-541.

Miguel Castro and Barbara Liskov. 1999. Practical Byzantine Fault Tolerance. In *Proceedings of the Third Symposium on Operating Systems Design and Implementation* (New Orleans, Louisiana, USA) (OSDI '99). USENIX Association, Berkeley, California, USA.

Neil Giridharan and Heidi Howard and Ittai Abraham and Natacha Crooks and Alin Tomescu, No-Commit Proofs: Defeating Livelock in BFT, Cryptology ePrint Archive, Paper 2021/1308, 2021/09/28, https://eprint.iacr.org/2021/1308

Leslie Lamport. 1998. The Part-time Parliament. *ACM Trans. Comput. Syst.* 16, 2 (May 1998), 133-169.

Maofan Yin, Dahlia Malkhi, Michael K. Reiter, Guy Golan-Gueta, and Ittai Abraham. 2019. *Hotstuff: BFT Consensus with Linearity and Responsiveness*. In *Proceedings of the 2019 ACM Symposium on Principles of Distributed Computing, PODC 2019.* Toronto, O.N., Canada. Jul. 29-Aug. 2, 2019. ACM, 347-356.

Michael J. Fischer, Nancy A. Lynch, and Mike Paterson. 1985. Impossibility of Distributed Consensus with One Faulty Process. *J. ACM* 32, 2 (1985), 374-382.

Ittai Abraham, T.-H. Hubert Chan, Danny Dolev, Kartik Nayak, Rafael Pass, Ling Ren, and Elaine Shi. 2019. Communication Complexity of Byzantine Agreement, Revisited. In *Proceedings of the 2019 ACM Symposium on Principles of Distributed Computing. PODC 2019.* Toronto, O.N., Canada, July 29-Aug. 2, 2019. ACM, 317-326.

Erica Blum, Jonathan Katz, Chen-Da Liu Zhang, and Julian Loss. 2020. Asynchronous Byzantine Agreement with Subquadratic Communication. *IACR Cryptol, ePrint Arch.* 2020 (2020), 851.

Ran Canetti and Tal Rabin. 1993. Fast Asynchronous Byzantine Agreement with Optimal Resilience. In *Proceedings of the Twenty-Fifth Annual ACM Symposium on Theory of Computing.*

Ittai Abraham, Philipp Jovanovic, Mary Mailer, Sarah Meiklejohn, Gilad Stern, and Alin Tomescu. 2021. Reaching Consensus for Asynchronous Distributed Key Generation. In *Podc '21.*

Eleftherios Kokoris-Kogias, Alexander Spiegelman, and Dahlia Malkhi. 2020. Asynchronous Distributed Key Generation for Computationally-Secure Randomness, Consensus, and Threshold Signatures. In *ACM CCS 2020.*

Pierre-Louis Aublin, Rachid Guerraoui, Nikola Knezevic, Vivien Quéma, and Marko Vukolic. 2015. The Next 700 BFT Protocols. *ACM Trans. Comput. Syst.* 32, 4 (2015). 12:1-12:45

Guy Golan-Gueta, Ittai Abraham, Shelly Grossman, Dahlia Malkhi, Benny Pinkas, Michael K. Reiter, Dragos-Adrian Seredinschi, Orr Tamir, and Alin Tomescu. 2018. SBFT: a Scalable Decentralized Trust Infrastructure for Blockchains. *CoRR* abs/1804.01626 (2018). arXiv:1804.01626 http://arxiv.org/abs/1804.01626

Ramakrishna Kotla, Lorenzo Alvisi, Michael Dahlin, Allen Clement, and Edmund L. Wong. 2009. Zyzzyva: Speculative Byzantine fault tolerance. *ACM Trans. Comput. Syst.* 27, 4 (2009), 7:1-7:39.

Ittai Abraham, Guy Gueta, and Dahlia Malkhi. 2018. Hot-Stuff the Linear, Optimal Resilience, One-Message BFT Devil. *CoRR* abs/1803.05069 (2018). https://eprint, iacr.org/2020/406.

Ittai Abraham, Guy Gueta, Dahlia Malkhi. Lorenzo Alvisi, Ramakrishna Kotla, and Jean-Philippe Martin. 2017. Revisiting Fast Practical Byzantine Fault Tolerance. *CoRR* abs/1712.01367 (2017).

Ethan Buchman. 2016. *Tendermint: Byzantine Fault Tolerance in the Age of Blockchains.* Ph.D. Dissertation. University of Guelph.

Vitalik Buterin and Virgil Griffith. 2017. Casper the Friendly Finality Gadget. *CoRR* abs/1710.09437 (2017).

Thomas Attema, Ronald Cramer, and Matthieu Rambaud. 2020. Compressed Sigma-Protocols for Bilinear Circuits and Applications. Asiacrypt 2021. Cryptology ePrint Archive, Report 2020/1447. version 2021/3/10 https://eprint.iacr.org/eprintbin/getfile.pl?entry=2020/1447&version=20210310:160359&file=1447.pdf.

Xiao Sui and Sisi Duan and Haibin Zhang, BG: A Modular Treatment of BFT Consensus, Cryptology ePrint Archive, Paper 2022/1433, 2022 https://eprint.iacr.org/2022-1433

The invention claimed is:

1. A method for implementing linear view-change in a Byzantine Fault Tolerant (BFT) protocol running on a distributed system comprising n replicas, wherein no more than t of the n replicas are faulty, and wherein the BFT protocol enables the non-faulty replicas to agree on how to sequence execution of a plurality of service operations originating from one or more clients, the method comprising:

executing, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiating a view-change with at least the following steps:

if current phase number $\varphi$ is different than 1, each replica $P_{i(1=1\ldots n)}$ sets $\varphi_i$ the highest phase number up to said current phase $\varphi$ for which said replica $P_i$ received said lock certificate associated with a value $I_i$, or each replica $P_{i(1=1\ldots n)}$ sets said phase number $\varphi_i$ equal to 0 if said replica did not receive any lock certificate; each replica $P_i$ sending to a leader replica $L_\varphi$ a message containing at least a report $(\varphi_i,\varphi)$, appended with said lock certificate $(I_i,\varphi_i)$ if $\varphi_i \geq 1$, and on the leader replica $L_\varphi$ side:

if said current phase number $\varphi$ is equal to 1, said leader replica $L_\varphi$ sets a value equal to an input I and sends a proposition message to the replicas including said value I, or if said current phase number $\varphi$ is different than 1, upon receiving messages from 2t+1 distinct replicas, with one such message from a replica $i_{max}$ containing a report $(\varphi_{imax},\varphi)$ such that a phase number $\varphi_{imax}$ is the highest phase number $\varphi_i$ out of the said 2t+1 reports $(\varphi_i,\varphi)$ received, a phase number $\varphi_{max}$ is then set equal to the phase number $\varphi_{imax}$ and a value $I_{max}$ is set equal to $I_{imax}$ the value contained in the lock certificate $(I_{imax},\varphi_{imax})$ appended to the message from $i_{max}$, the leader replica $L_\varphi$ generating a message out of said 2t+1 distinct replicas, with:

(i) if said phase number $\varphi_{max}$ is greater than 0, said leader replica $L_\varphi$, having received at least one lock certificate $Lc_{max}(I_{max},\varphi_{max})$, sends a proposition message $(I_{max},\varphi, PnS(\varphi_{max},\varphi), Lc_{max})$ to the replicas; or (ii) if said phase number $\varphi_{max}$ is equal to 0, said leader replica $L_\varphi$ sets the value/equal to an input $I_{mod}$ and sends a proposition message $(I_{mod},\varphi,PnS(0,\varphi),\perp)$ to the replicas, in order to make the view-change effective in said distributed system.

2. The method of claim 1, wherein the message generated by the leader replica contains at least a proof $PnS((\varphi_{max},\varphi))$, embodied as of proof of existence of 2t+1 reports $(\varphi_i,\varphi)$ signed by 2t+1 replicas, including the phase numbers $\varphi_i$, which are all lower than or equal to the phase number $\varphi_{max}$.

3. The method of claim 1, wherein, for each non-faulty replica $P_i$ in the phase $\varphi$, with $\varphi_i \leq \varphi$ the highest phase number for which said replica $P_i$ received said lock certificate $(I_i,\varphi_i)$, each message sent by the replicas contains, along with a lock certificate in $\varphi_i$ if $1 \leq \varphi_i$, the following embodiment of report $(\varphi_i,\varphi)$, denoted as a "list of testimonies to be lower" with: for each integer value $\varphi^0 \in [\varphi_i, \ldots, \varphi]$, a data, which is signed using a threshold signature system $\sigma$ of threshold (2t+1), said signed data being denoted "testimony $(\varphi^0, \varphi)$", and carrying the information that {the said phase number set by the sender in phase $\varphi$ is lower than or equal to $\varphi^0$}, the proof $PnS(\varphi_{max}, \varphi)$ being then embodied as a threshold signature with threshold 2t+1 on the testimony $(\varphi_{max}, \varphi)$, which guarantees that 2t+1 replicas signed it.

4. The method of claim 1-or 2, wherein each replica $P_i$ (i=I ... n), upon receiving said proposition message from the leader replica $L_\varphi$ for the first time in the phase $\varphi$, replies with a signed lock vote message.

5. The method of claim 4, wherein said lock certificate is a (2t+1)-threshold signature on said lock vote message.

6. The method of claim 4, wherein the leader replica $L_\varphi$, upon receiving 2t+1 lock vote messages for the same input $I_{mod}$ or $I_{max}$, issues from said lock vote messages a lock certificate, which said leader replica $L_\varphi$ sends along with said input.

7. The method of claim 6, wherein each replica $P_{i\ (i=1\ \ldots\ )}$, upon receiving from the leader replica $L_\varphi$ a lock certificate for the first time in the phase $\varphi$, whatever the input I, replies with a signed decision vote message.

8. The method of claim 7, wherein the leader replica $L_\varphi$, upon receiving decision vote messages from 2t +1 distinct replicas for the same input, issues from said decision vote messages a decision certificate, which is sent by said leader replica $L_\varphi$ to the replicas in order to make the view-change effective in said distributed system, and, upon receiving said decision certificate for the input, each replica outputs a value I corresponding to said decision certificate.

9. The method of any one of claims 1, wherein only one lock certificate associated to one phase is formed.

10. The method of any one of claims 1, wherein, in each phase $\phi \geq 1$, the leader $L_\phi$ is a publicly known replica, being for example selected at random among n replicas.

11. A non-transitory computer readable storage medium having stored thereon program code embodying a method for implementing linear view-change in a Byzantine Fault Tolerant (BFT) protocol running on a distributed system comprising n replicas, wherein no more than t of the n replicas are faulty, and wherein the BFT protocol enables the non-faulty replicas to agree on how to sequence execution of a plurality of service operations originating from one or more clients, the method comprising:

executing, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiating a view-change with at least the following steps:

if current phase number $\varphi$ is different than 1, each replica $P_{i(1=1\ \ldots\ n)}$ sets $\varphi_i$ the highest phase number up to said current phase $\varphi$ for which said replica $_{Pi}$ received said lock certificate associated with a value $I_i$, or each replica $P_{i(1=1\ \ldots\ n)}$ sets said phase number $\varphi_i$ equal to 0 if said replica did not receive any lock certificate; each replica $P_i$ sending to a leader replica $L_\varphi$ a message containing at least a report $(\varphi_i,\varphi)$, appended with said lock certificate $(I_i,\varphi_i)$ if $\varphi_i \geq 1$, and on the leader replica $L_\varphi$ side:

if said current phase number $\varphi$ is equal to 1, said leader replica $L_\varphi$ sets a value equal to an input I and sends a proposition message to the replicas including said value I, or if said current phase number $\varphi$ is different than 1, upon receiving messages from 2t+1 distinct replicas, with one such message from a replica $i_{max}$ containing a report $(\varphi_{imax}, \varphi)$ such that a phase number $\varphi_{imax}$ is the highest phase number $\varphi_i$ out of the said 2t+1 reports $(\varphi_i,\varphi)$ received, a phase number $\varphi_{max}$ is then set equal to the phase number $\varphi_{imax}$ and a value $I_{max}$ is set equal to $I_{imax}$ the value contained in the lock certificate $(I_{imax}, \varphi_{max})$ appended to the message from $i_{max}$, the leader replica $L_\varphi$ generating a message out of said 2t+1 distinct replicas, with:

(i) if said phase number $\varphi_{max}$ is greater than 0, said leader replica $L_\varphi$, having received at least one lock certificate $Lc_{max}(I_{max},\varphi_{max})$, sends a proposition message $(I_{max}, \varphi,PnS(\varphi_{max},\varphi)\ Lc_{max})$ to the replicas; or (ii) if said phase number $\varphi_{max}$ is equal to 0, said leader replica $L_\varphi$ sets the value I equal to an input $I_{mod}$ and sends a proposition message $(I_{mod},\varphi,PnS(0,\varphi), \perp)$ to the replicas, in order to make the view-change effective in said distributed system.

12. A distributed system comprising:

n replicas, and a non-transitory computer readable storage medium having stored thereon program code that, when executed, enables the distributed system to implement linear view-change in a Byzantine Fault Tolerant (BFT) protocol running on said distributed system, wherein no more than t of the n replicas are faulty, and wherein the BFT protocol enables the non-faulty replicas to agree on how to sequence execution of a plurality of service operations originating from one or more clients, the program code causing said distributed system to:

execute, among and by the n replicas, a phase of the BFT protocol, phases being numbered as positive numbers $\varphi=1,2,\ldots$, in each phase one or several consecutive replicas playing a specific role and being identified as leader replica, a lock certificate being associated with said phase; and if 2t+1 communicating instances of said lock certificate are not received by the n replicas within a predetermined timeout period, initiating a view-change with at least the following steps:

if current phase number $\varphi$ is different than 1, each replica $P_{i(1=1\ \ldots\ n)}$ sets $\varphi_i$ the highest phase number up to said current phase φ for which said replica Pi received said lock certificate associated with a value $I_i$, or each replica $P_{i(1=1\ldots n)}$ sets said phase number $φ_i$ equal to 0 if said replica did not receive any lock certificate; each replica $P_i$ sending to a leader replica $L_φ$ a message containing at least a report $(φ_i,φ)$, appended with said lock certificate $(I_i,φ_i)$ if $φ_i≥1$, and on the leader replica Lo side:

if said current phase number φ is equal to 1, said leader replica $L_φ$ sets a value equal to an input I and sends a proposition message to the replicas including said value I, or if said current phase number φ is different than 1, upon receiving messages from 2t+1 distinct replicas, with one such message from a replica $i_{max}$ containing a report $(φ_{imax},φ)$ such that a phase number $φ_{imax}$ is the highest phase number oi out of the said 2t+1 reports $(φ_i,φ)$ received, a phase number $φ_{max}$ is then set equal to the phase number $P_{imax}$ and a value $I_{max}$ is set equal to $I_{imax}$ the value contained in the lock certificate $(I_{imax},φ_{imax})$ appended to the message from $i_{max}$, the leader replica $L_φ$ generating a message out of said 2t+1 distinct replicas, with:

(i) if said phase number $φ_{max}$ is greater than 0, said leader replica Lo, having received at least one lock certificate $Lc_{max}(I_{max},φ_{max})$, sends a proposition message $(I_{max}, φ,PnS(φ_{max},φ), Lc_{max})$ to the replicas; or (ii) if said phase number $φ_{max}$ is equal to 0, said leader replica $L_φ$ sets the value I equal to an input $I_{mod}$ and sends a proposition message $(I_{mod},φ,PnS(0,φ), ⊥)$ to the replicas, in order to make the view-change effective in said distributed system.

13. A method for implementing linear view-change in a Byzantine Fault Tolerant (BFT) protocol running on a distributed system comprising n replicas, wherein no more than t of the n replicas are faulty, and wherein the BFT protocol enables at least 2t+1 of the n replicas to agree on how to sequence execution of a plurality of service operations originating from one or more clients, the method comprising:

executing, among and by the n replicas, a phase φ of the BFT protocol, communicating instances of a lock certificate being associated with said phase; and if 2t+1 communicating instances of said lock certificate are not received by the n replicas within a predetermined timeout period, initiating a view-change with at least the following steps:

each replica $P_{i(i=1\ldots n)}$ sets $φ_i$ the highest phase number up to current phase o for which said replica $P_i$ received said lock certificate associated with an input value $I_i$, or each replica $P_{i(i=1\ldots n)}$ sets said phase number oi equal to 0 if said replica did not receive any lock certificate; each replica $P_i$ sends to a leader replica $L_φ$ a report $(φ_i,φ)$, appended with a full lock certificate $(I_i,φ_i)$ if $φ_i≥1$, and initiates an instance of an exclusivity protocol with respect to its respective input value $I_i$, the leader replica being a chosen prover L, said exclusivity protocol being a protocol that guarantees:

(a) if either said prover L knows a valid value or at least t+1 non-faulty replicas have a valid input value, after a round-trip of messages between said prover L and the replicas, the prover L outputs a valid input $I_{select}$, and (b) after another round-trip of messages between said prover L and the replicas, the prover L outputs a report POE $(I_{select})$, the leader replica $L_φ$, upon receiving a set R of report messages from 2t+1 distinct replicas, with a phase number $φ_{max}$ set to be the highest phase number $φ_i$ received and associated with a value $I_{max}$:

(i) if said phase number $φ_{max}$ is greater than 0, said leader replica $L_φ$, having received at least one full lock certificate $FLc_{max}(I_{max}, φmax)$, sends a proposition message $(I_{max},φ,PnS(φ_{max},φ), FLc_{max})$ to the replicas, with $PnS(φ_{max},φ)$ a report generated by the leader replica $L_φ$ out of said 2t+1 distinct replicas; or (ii) if said phase number $φ_{max}$ is equal to 0, then said leader replica $L_φ$ selects said valid input $I_{select}$, in function of said exclusivity protocol, and sends a proposition message $(I_{select},φ,PnS(0,φ),⊥)$ to the replicas, in order to make the view-change effective in said distributed system.

14. The method of claim 13, wherein, during an instance of the exclusivity protocol, a value I satisfies a condition denoted the Exclusivity Predicate if and only if no other value I'is a unanimous input of non-faulty replicas, a report PoE(I) being a proof that I satisfies said condition of Exclusivity Predicate.

15. The method of claim 13, wherein a proof of exclusivity PoE(v) of a value v, relative to a publicly known fixed tag, proves knowledge of one of the two following cases:

(i) either of a set $I⊂\{1,\ldots,n\}$ of t+1 distinct indices, together with a signature from each replica $i∈I$ for the message (v, tag), (ii) or of a set S of 2t+1 messages $(v_j$, tag) for $j=1,\ldots,2t+1$, each signed by a distinct replica, such that no value $v_j$ repeats identically in strictly more than t messages, preferably, if the prover is in the case (i), where some value v repeats t+1 times, then said prover proves this with a (t+1)-threshold signature on v, and preferably, if the prover is in the case (ii), where no value repeats more than t times in S, the prover proves knowledge of a decomposition of S into three disjunct nonempty subsets of values, with repetitions: $S=S_{low}∪\{V_{med}\}∪S_{high}$, all of cardinalities at most t, and such that all values in the subset $S_{low}$ are strictly smaller than the value $V_{med}$, and proves that the value $V_{med}$ is itself strictly smaller than all values in the subset $S_{high}$.

16. The method of any one of claims 13, wherein each replica $P_{i(i=1\ldots n)}$, upon receiving said proposition message from the leader replica $L_φ$ for the first time in the phase φ, replies with a signed lock vote message.

17. The method of claim 16, wherein, upon receiving 2t+1 lock vote messages for the same $(I_{select}, φ)$ or $(I_{max},φ)$ and with:

i) if the prover L already had a full lock certificate associated with its value $I_i$, the prover L extracts a report $PoE(I_i)$ according to the exclusivity protocol, or ii) the prover L had selected a valid input $I_{select}$ in the previous instance of the exclusivity protocol, and has a valid report POE $(I_{select})$, the leader replica $L_φ$ aggregates the 2t+1 lock vote messages, and appends them with said PoE obtained at step i) or step ii), to issue a full lock certificate, which said leader replica $L_φ$ sends along with said selected input $I_{select}$ or value $I_{max}$.

18. The method of claim 17, wherein each replica $P_{i(i=1\ldots n)}$, upon receiving from the leader replica $L_φ$ a full lock certificate for the first time in the phase φ, whatever the input I, replies with a signed decision vote message.

19. The method of claim 18, wherein the leader replica $L_φ$, upon receiving decision vote messages from 2t+1 distinct replicas for the same value $I_{select}$ or $I_{max}$, issues from said decision vote messages a decision certificate, which is sent by said leader replica $L_\varphi$ to the replicas in order to make the view-change effective in said distributed system, and, upon receiving said decision certificate for the value $I_{select}$ or $I_{max}$, each replica outputs the chosen value and continues said exclusivity protocol.

20. The method of claim 13, being applicable to any possible consensus protocol that offers other trade-offs in security.

21. The method of claim 13, wherein the exclusivity protocol has a complexity of O(nlog (n)), with n the number of replicas.

22. A non-transitory computer readable storage medium having stored thereon program code embodying a method for implementing linear view-change in a Byzantine Fault Tolerant (BFT) protocol running on a distributed system comprising n replicas, wherein no more than t of the n replicas are faulty, and wherein the BFT protocol enables at least 2t+1 of the n replicas to agree on how to sequence execution of a plurality of service operations originating from one or more clients, the method comprising:

executing, among and by the n replicas, a phase $\varphi$ of the BFT protocol, communicating instances of a lock certificate being associated with said phase; and if 2t+1 communicating instances of said lock certificate are not received by the n replicas within a predetermined timeout period, initiating a view-change with at least the following steps:

each replica $P_{i(i=1\ldots n)}$ sets $\varphi_i$ the highest phase number up to current phase $\varphi$ for which said replica $P_i$ received said lock certificate associated with an input value $I_i$, or each replica $P_{i(i=1\ldots n)}$ sets said phase number $\varphi_i$ equal to 0 if said replica did not receive any lock certificate;

each replica $P_i$ sends to a leader replica $L_\varphi$ a report $(\varphi_i,\varphi)$, appended with a full lock certificate $(I_i,\varphi_i)$ if $\varphi_i \geq 1$, and initiates an instance of an exclusivity protocol with respect to its respective input value $I_i$, the leader replica being a chosen prover L, said exclusivity protocol being a protocol that guarantees:

(a) if either said prover L knows a valid value or at least t+1 non-faulty replicas have a valid input value, after a round-trip of messages between said prover L and the replicas, the prover L outputs a valid input $I_{select}$, and (b) after another round-trip of messages between said prover L and the replicas, the prover L outputs a report POE($I_{select}$), the leader replica $L_\varphi$, upon receiving a set R of report messages from 2t+1 distinct replicas, with a phase number $\varphi_{max}$ set to be the highest phase number $\varphi_i$ received and associated with a value $I_{max}$:

(i) if said phase number $\varphi_{max}$ is greater than 0, said leader replica $L_\varphi$, having received at least one full lock certificate $FLc_{max}(I_{max},\varphi_{max})$, sends a proposition message $(I_{max},\varphi, PnS(\varphi_{max},\varphi), FLc_{max})$ to the replicas, with $PnS(\varphi_{max},\varphi)$ a report generated by the leader replica $L_\varphi$ out of said 2t+1 distinct replicas; or (ii) if said phase number $\varphi_{max}$ is equal to 0, then said leader replica $L_\varphi$ selects said valid input $I_{select}$, in function of said exclusivity protocol, and sends a proposition message $(I_{select},\varphi,PnS(0,\varphi),\perp)$ to the replicas, in order to make the view-change effective in said distributed system.

23. A distributed system comprising:

n replicas, and a non-transitory computer readable storage medium having stored thereon program code that, when executed, enables the distributed system to implement linear view-change in a Byzantine Fault Tolerant (BFT) protocol running on said distributed system, wherein no more than t of the n replicas are faulty, and wherein the BFT protocol enables at least 2t+1 of the n replicas to agree on how to sequence execution of a plurality of service operations originating from one or more clients, the program code causing said distributed system to:

execute, among and by the n replicas, a phase $\varphi$ of the BFT protocol, communicating instances of a lock certificate being associated with said phase; and if 2t+1 communicating instances of said lock certificate are not received by the n replicas within a predetermined timeout period, initiate a view-change with at least the following steps:

each replica $P_{i(i=1\ldots n)}$ sets $\varphi_i$ the highest phase number up to current phase $\varphi$ for which said replica $P_i$ received said lock certificate associated with an input value $I_i$, or each replica $P_{i(i=1\ldots n)}$ sets said phase number $\varphi_i$ equal to 0 if said replica did not receive any lock certificate;

each replica $P_i$ sends to a leader replica $L_\varphi$ a report $(\varphi_i,\varphi)$, appended with a full lock certificate $(I_i,\varphi_i)$ if $\varphi_i \geq 1$, and initiates an instance of an exclusivity protocol with respect to its respective input value $I_i$, the leader replica being a chosen prover L, said exclusivity protocol being a protocol that guarantees:

(a) if either said prover L knows a valid value or at least t+1 non-faulty replicas have a valid input value, after a round-trip of messages between said prover L and the replicas, the prover L outputs a valid input $I_{select}$, and (b) after another round-trip of messages between said prover L and the replicas, the prover L outputs a report POE($I_{select}$), the leader replica $L_\varphi$, upon receiving a set R of report messages from 2t+1 distinct replicas, with a phase number $\varphi_{max}$ set to be the highest phase number $\varphi_i$ received and associated with a value $I_{max}$:

(i) if said phase number $\varphi_{max}$ is greater than 0, said leader replica $L_\varphi$, having received at least one full lock certificate $FLc_{max}(I_{max},\varphi_{max})$, sends a proposition message $(I_{max},\varphi, PnS(\varphi_{max},\varphi), FLc_{max})$ to the replicas, with $PnS(\varphi_{max},\varphi)$ a report generated by the leader replica $L_\varphi$ out of said 2t+1 distinct replicas; or (ii) if said phase number $\varphi_{max}$ is equal to 0, then said leader replica $L_\varphi$ selects said valid input $I_{select}$, in function of said exclusivity protocol, and sends a proposition message $(I_{select},\varphi,PnS(0,\varphi),\perp)$ to the replicas, in order to make the view-change effective in said distributed system.

24. A method for implementing linear view-change in a Byzantine Fault Tolerant (BFT) protocol running on a distributed system comprising n replicas, wherein no more than t of the n replicas are faulty, and wherein the BFT protocol enables the non-faulty replicas to agree on how to sequence execution of a plurality of service operations originating from one or more clients, the method comprising:

each replica $P_{i(i=1\ldots n)}$ sets $\varphi_i$ the highest phase number up to current phase $\varphi$ for which said replica $P_i$ received a LockCertificate (input value $I_i$, phase number $\varphi_i$) or each replica $P_{i(i=1\ldots n)}$ sets said phase number $\varphi_i$ equal to 0 if said replica did not receive any LockCertificate;

each replica $P_i$ sends to a leader replica $L_\varphi$ a report $(\varphi_i,\varphi)$, appended with a LockCertificate $(I_i,\varphi_i)$ if $\varphi_i \geq 1$ the leader replica $L_\varphi$, upon receiving a set R of report messages from 2t+1 distinct replicas, with a phase number $\varphi_{max}$ set to be the highest phase number oi received and associated with a value $I_{max}$:

(i) if said phase number $\varphi_{max}$ is greater than 0, said leader replica $L_\varphi$, having received at least one LockCertificatemax $(I_{max},\varphi_{max})$, sends a proposition message $(I_{max},\varphi, LockCertificate(I_{max},\varphi_{max}))$ to the replicas, or, (ii) if said phase number (max is equal to 0, said leader replica sets the value I equal to an input $I_{mod}$ and sends a proposition message $(I_{mod},\varphi,\perp)$ to the replicas, the leader replica $L_\varphi$, only in the situation where: {it has sent a proposition message with a lock certificate $Lc_{max}(I_{max},\varphi_{max})$, and it receives from some replica $P_i$, a report $(\varphi_i,\varphi)$ message with a phase number $\varphi_i$ strictly higher than $\varphi_{max}$}: then leader replies to the replica $P_i$ with a Proof_of_non-Supermajority$(\varphi_{max},\varphi)$ formed out of the report messages, each replica $P_{i(i=1\ldots n)}$, upon receiving said proposition message $(I_{max},\varphi,LockCertificate(I_{max},\varphi_{max}))$ or $(I_{mod},\varphi,\perp)$ from the leader replica $L_\varphi$ for the first time in the phase $\varphi$, i) if the said set phase number $\varphi_i$ is lower than or equal to said phase number $\varphi_{max}$ contained in the proposed LockCertificate $(I,\varphi_{max})$ if any, or than 0 if no Lock-Certificate is included in the proposition;

ii) or if it also received a Proof_of_non-Supermajority $(\varphi_{max},\varphi)$; then it replies with a signed lock vote message $(I_{mod},\varphi)$ or $(I_{max},\varphi)$, the leader replica $L_\varphi$, upon receiving a set of 2t+1 lock votes for said value I:

(iii) forms a lock certificate$(I,\varphi)$, shortened as "Lc", consisting of the aggregation of the 2t+1 signatures on said signed lock votes, into a threshold signature, then sends it to the replicas, replica $P_{i(i=1\ldots n)}$, upon receiving from the leader replica $L_\varphi$ a $Lc(I,\varphi)$ for the first time in the phase $\varphi$, whatever the value I, replies with a signed decision vote message.

* * * * *